United States Patent
Lam et al.

(10) Patent No.: US 9,256,521 B1
(45) Date of Patent: Feb. 9, 2016

(54) METHODS AND APPARATUS FOR SAS CONTROLLERS WITH LINK LIST BASED TARGET QUEUES

(75) Inventors: Raymond Lam, Vancouver (CA); Ivy Chow, Vancouver (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 64 days.

(21) Appl. No.: 13/288,637

(22) Filed: Nov. 3, 2011

Related U.S. Application Data

(60) Provisional application No. 61/409,656, filed on Nov. 3, 2010.

(51) Int. Cl.
  *G06F 12/00* (2006.01)
  *G06F 9/46* (2006.01)

(52) U.S. Cl.
  CPC ...................................... *G06F 12/00* (2013.01)

(58) Field of Classification Search
  CPC ....................................................... G06F 12/00
  USPC ........................................................... 711/114
  See application file for complete search history.

(56) References Cited

U.S. PATENT DOCUMENTS

| | | | |
|---|---|---|---|
| 7,043,567 B2 * | 5/2006 | Trantham | 710/6 |
| 8,156,415 B1 * | 4/2012 | Nguyen et al. | 714/807 |
| 2005/0015545 A1 * | 1/2005 | Liu et al. | 711/114 |
| 2005/0235072 A1 * | 10/2005 | Smith et al. | 710/22 |
| 2007/0011333 A1 | 1/2007 | Lau et al. | |
| 2007/0088895 A1 * | 4/2007 | Gustafson et al. | 710/306 |
| 2011/0252210 A1 * | 10/2011 | Davies | 711/165 |

* cited by examiner

*Primary Examiner* — Yong Choe
*Assistant Examiner* — Gautam Sain
(74) *Attorney, Agent, or Firm* — Dennis R. Haszko

(57) ABSTRACT

A controller comprising a transport layer, an internal memory, and a link list manager block. The internal memory stores pending instruction entries. The link list manager block is configured to read instructions stored in an external memory, update an active vector, the active vector for storing indications of instructions from the external memory; update the pending instruction entries in the internal memory; and update the instructions stored in the external memory. The link list manager block configured to dispatch a instruction from the pending instruction entries in the internal memory to the transport layer.

13 Claims, 42 Drawing Sheets

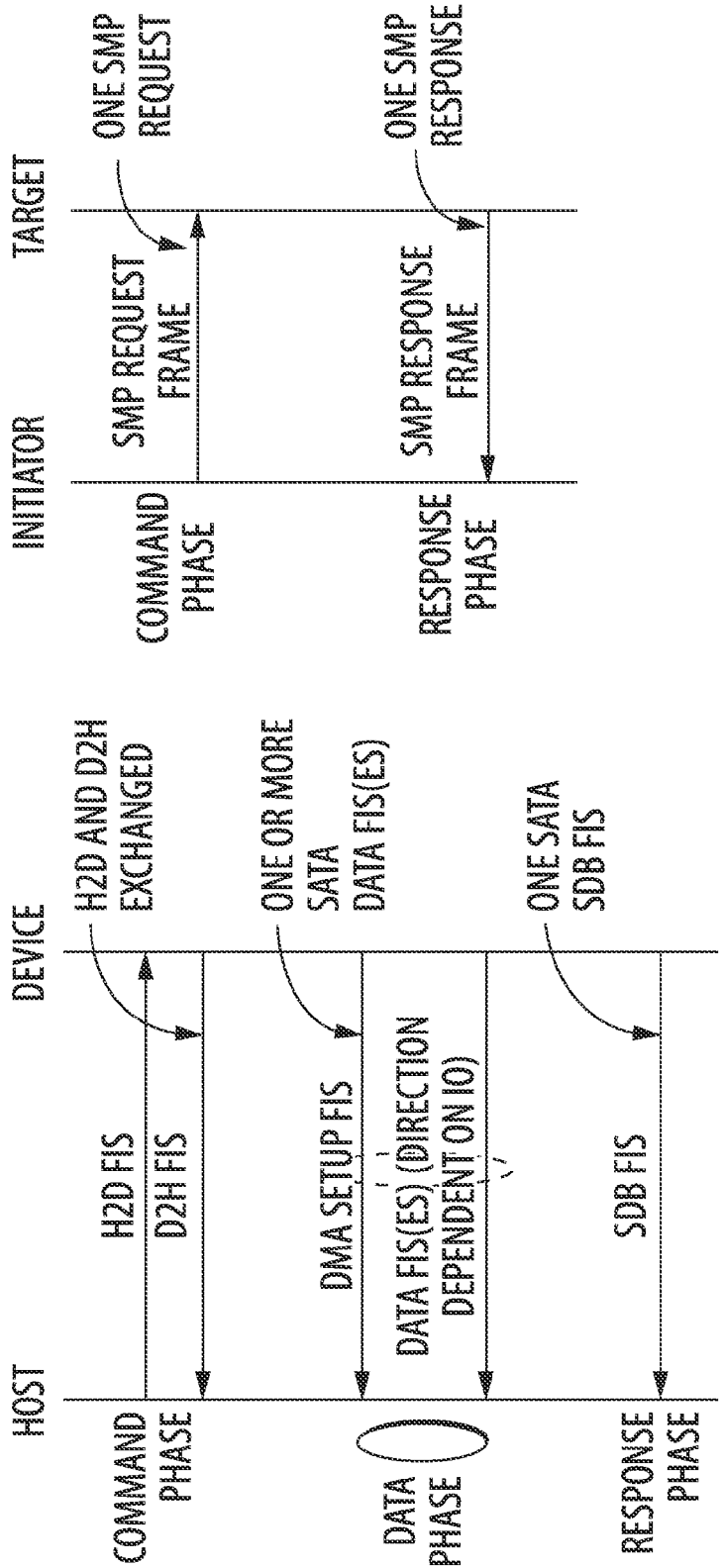

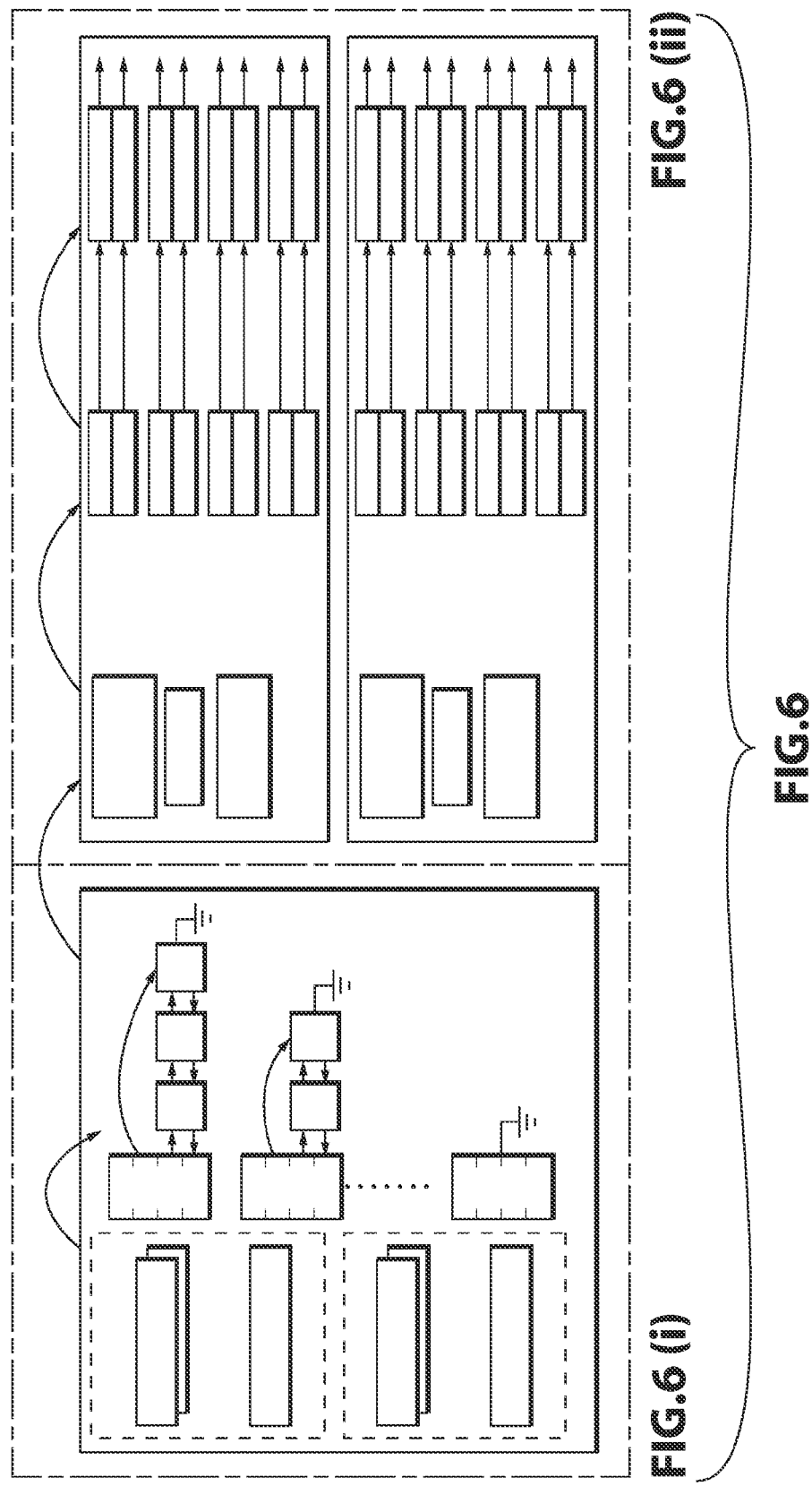

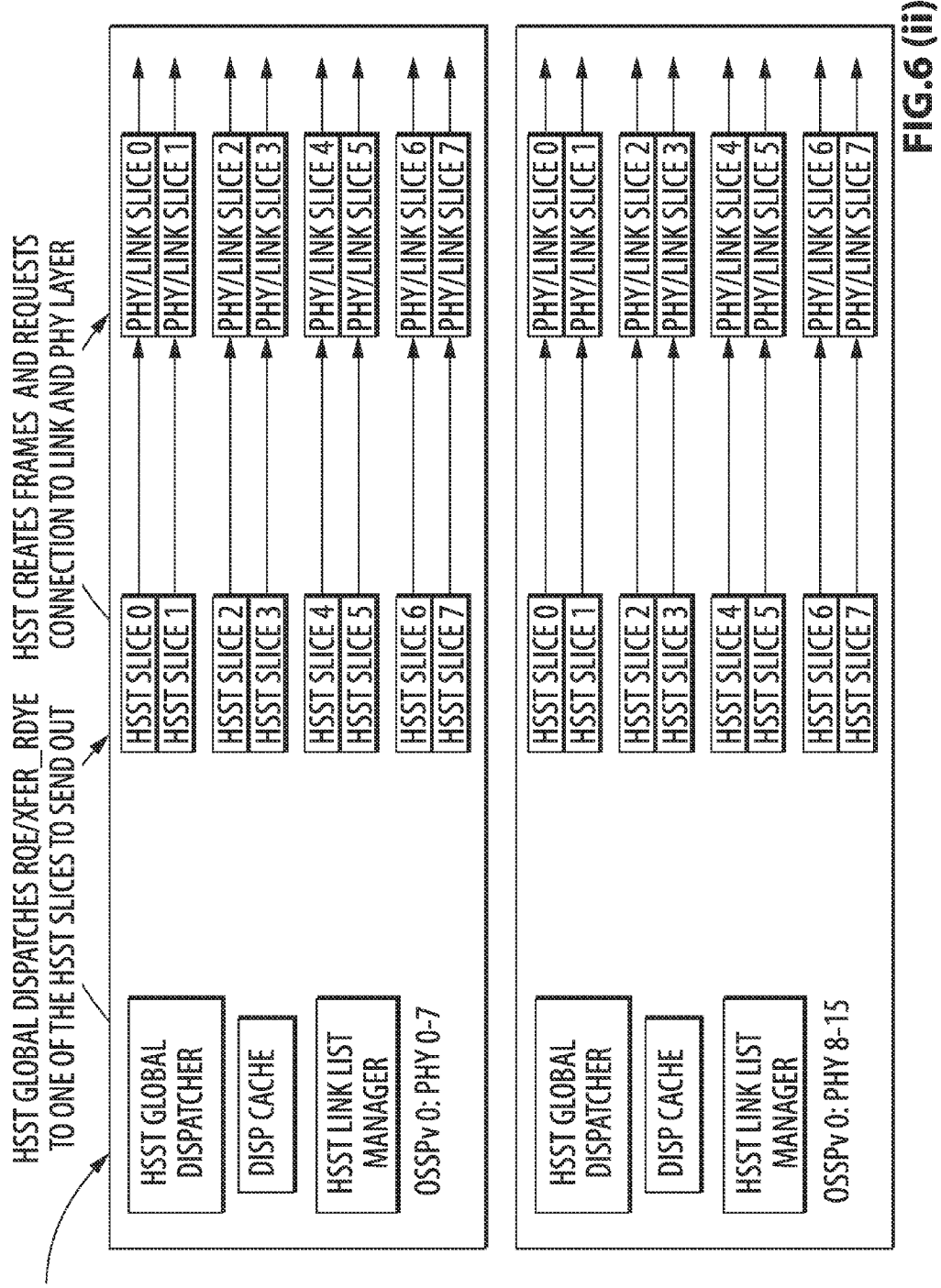
FIG. 6 (ii)

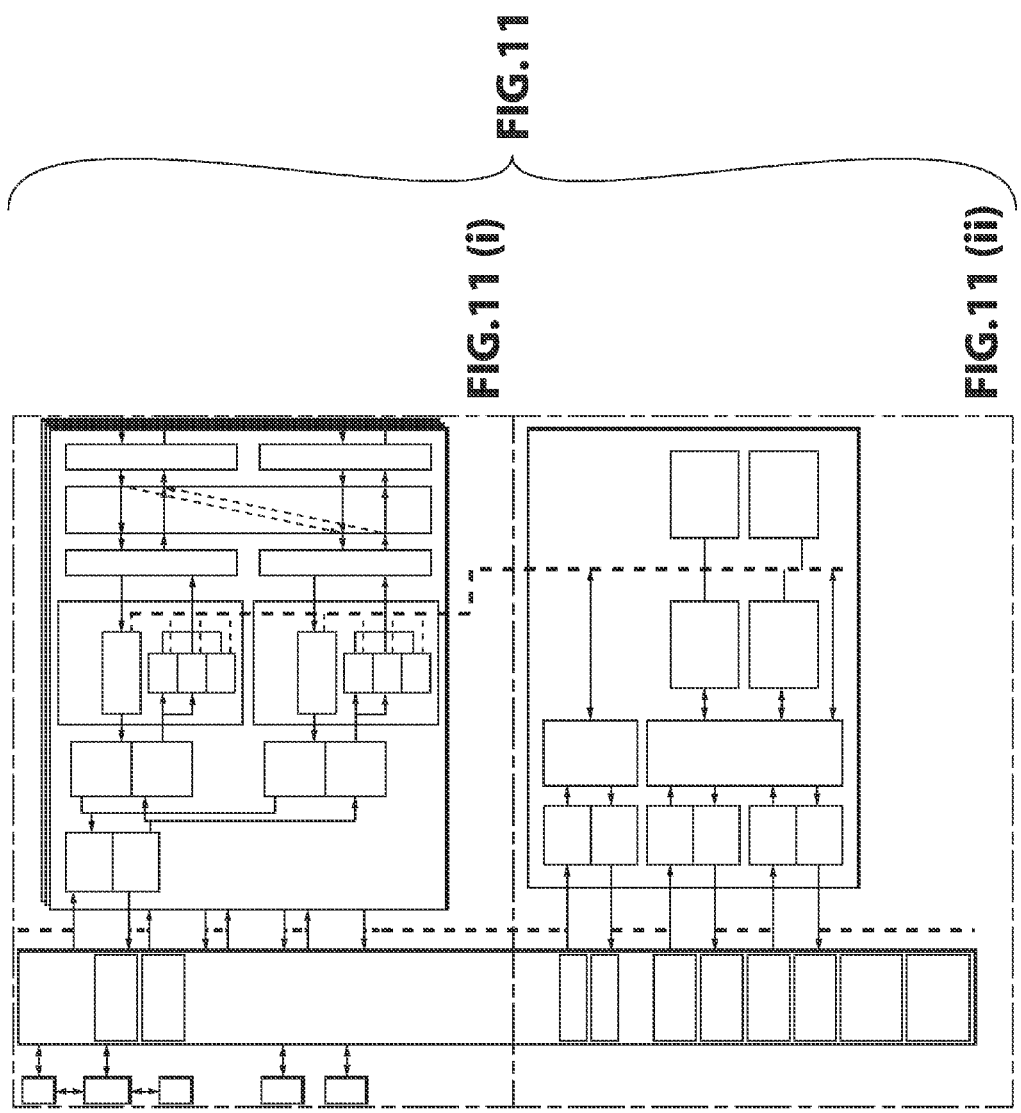

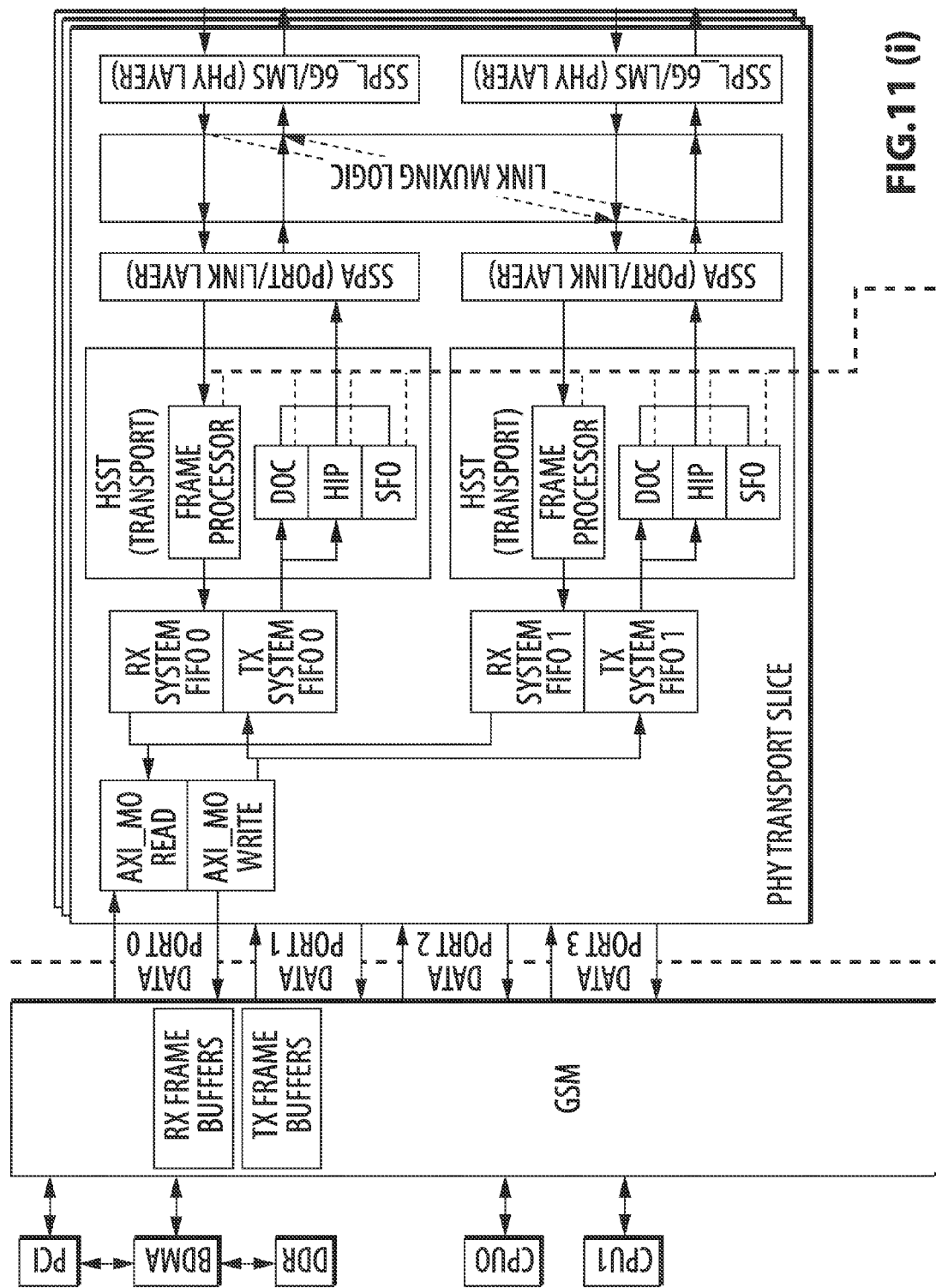

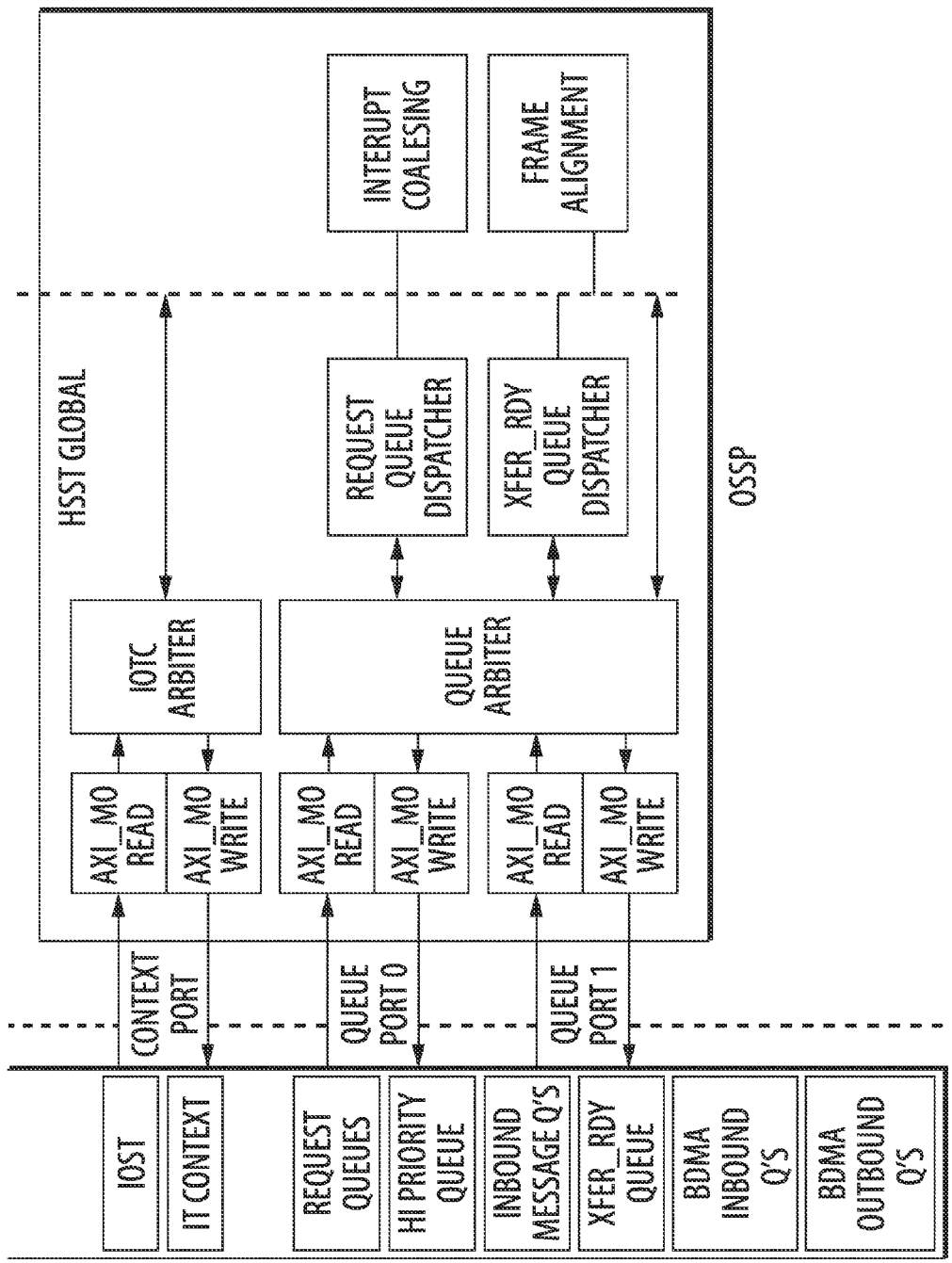
FIG. 11 (ii)

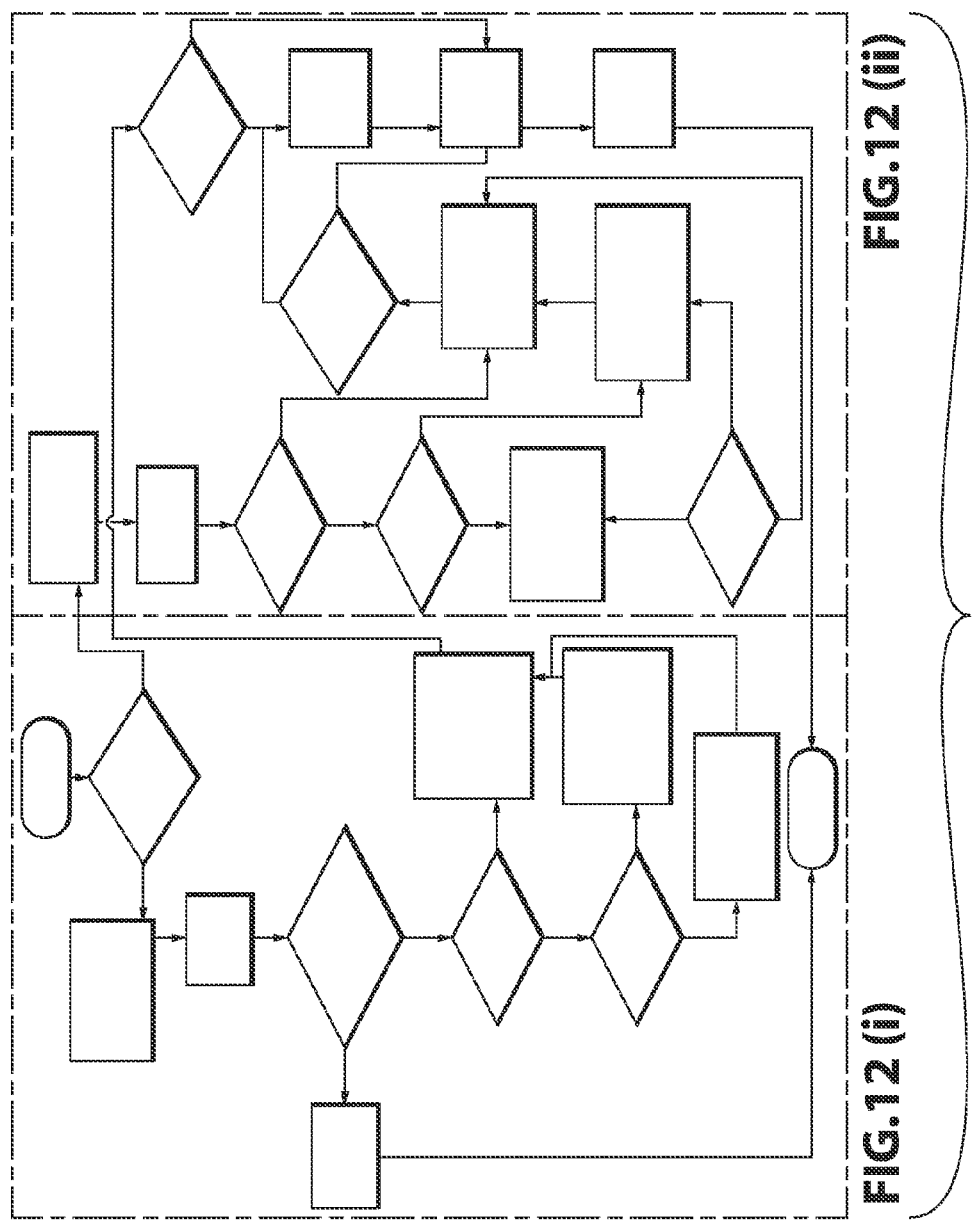
FIG. 12(iii)
FIG. 12(ii)
FIG. 12

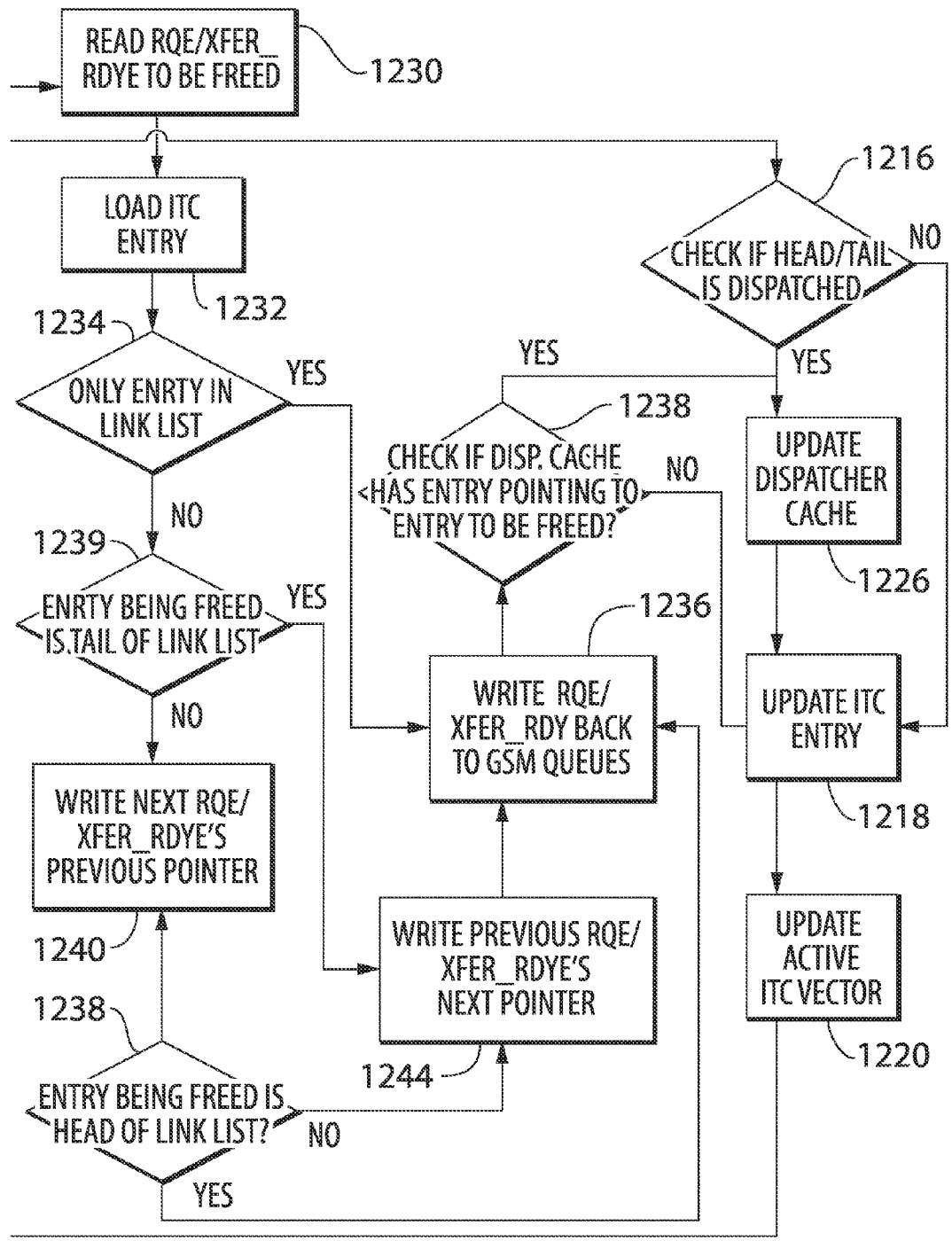
FIG.12 (ii)

METHODS AND APPARATUS FOR SAS CONTROLLERS WITH LINK LIST BASED TARGET QUEUES

CROSS REFERENCE TO RELATED APPLICATIONS

This application claims the benefit of priority of U.S. Provisional Patent Application No. 61/409,656 filed on Nov. 3, 2010, which is incorporated herein by reference in its entirety.

FIELD OF TECHNOLOGY

The present disclosure relates to methods and devices for interfacing a computing device to network devices or storage devices.

BACKGROUND

Computing devices are often coupled to storage and networking devices in order to, for example, but not limited to, store data. Examples of storage devices can include for example, magnetic storage devices, such as hard disk drives, and solid state drives, such as flash memory devices. There is circuitry that interfaces between the computing device and the storage device or between the computing device and the network device. Such circuitry can include processors, which execute firmware, for example, and controllers that are coupled to the processors and execute instructions issued by the processor.

SUMMARY

According to one aspect, embodiments described herein relate to a controller comprising a transport layer, an internal memory, and a link list manager block. The internal memory stores pending instruction entries. The link list manager block is configured to read instructions stored in an external memory, update an active vector, the active vector for storing indications of instructions from the external memory; update the pending instruction entries in the internal memory; and update the instructions stored in the external memory. The link list manager block is configured to dispatch a instruction from the pending instruction entries in the internal memory to the transport layer.

In some embodiments, the active vector is stored in the internal memory.

In some embodiments, the controller is a SAS/SATA controller.

In various embodiments, the global block comprises the link list manager and the link list dispatcher.

In some embodiments, the dispatcher dispatches the instructions to at least one of the plurality of slices.

In some embodiments, the instructions comprise a connection request for a remote device. In various embodiments the remote device can be a storage device or networking device.

In some embodiments, the dispatcher backs off the request if the device is unavailable.

In some embodiments, a link list stored in the external memory for the remote device, the link list representing instructions issued in relation to the remote device. In some embodiments, the link list comprises a series of pointers stored in the external memory.

According to another aspect, a host controller comprising: a global memory; a processor for writing instructions to the global memory; and a controller is provided herein. The controller comprises: an internal memory; a link list manager block; and a link list dispatcher module. The internal memory stores pending instruction entries. The link list manager block is configured to: read instructions stored in external memory; update an active vector, the active vector for storing indications of instructions in the external memory; update the pending instruction entries in the internal memory; and update the instructions stored in the external memory; the link list manager block configured to: dispatch a instruction from the pending instruction entries in the internal memory.

In some embodiments, the active vector is stored in the internal memory.

In some embodiments, the controller is a SAS/SATA controller.

In various embodiments, the global block comprises the link list manager and the link list dispatcher.

In some embodiments, the dispatcher dispatches the instructions to at least one of the plurality of slices.

In some embodiments, the instructions comprise a connection request for a remote device. In various embodiments the remote device can be a storage device or networking device.

In some embodiments, the dispatcher backs off the request if the device is unavailable.

In some embodiments, a link list stored in the external memory for the remote device, the link list representing instructions issued in relation to the remote device. In some embodiments, the link list comprises a series of pointers stored in the external memory.

According to another aspect, a method of interfacing a computing device to another device is provided herein. The method comprising: writing instructions to a global memory; reading the instructions from the global memory; updating an active vector, the active vector for storing indications of instructions in the external memory; dispatching instructions; and updating the external memory.

Other aspects and features of the present disclosure will become apparent to those ordinarily skilled in the art upon review of the following description of example embodiments in conjunction with the accompanying figures.

BRIEF DESCRIPTION OF THE DRAWINGS

Embodiments of the present disclosure will now be described, by way of example only, with reference to the accompanying figures:

FIG. 3 is a flow diagram illustrating a typical STP/SATA IO command;

FIG. 4 is a flow diagram illustrating a typical SMP IO command;

FIG. 11 is a schematic diagram of a SAS block coupled to an external GSM according to various embodiments;

DETAILED DESCRIPTION

Figure 1:
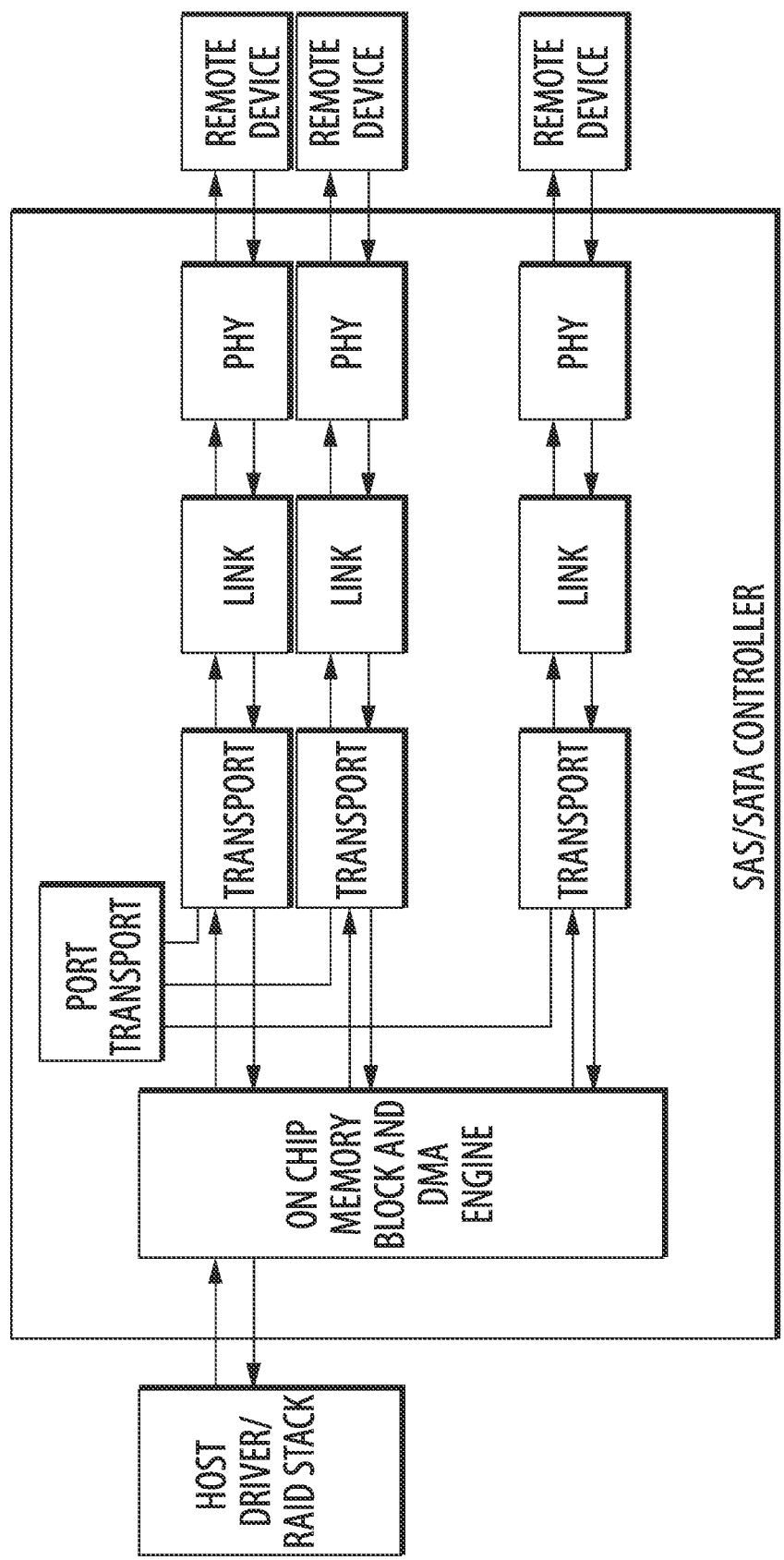
FIG. 1 is a block diagram illustrating a typical SAS/SATA controller.

The following describes a controller comprising a transport layer, an internal memory, and a link list manager block. The internal memory stores pending instruction entries. The link list manager block is configured to read instructions stored in an external memory, update an active vector, the active vector for storing indications of instructions from the external memory; update the pending instruction entries in the internal memory; and update the instructions stored in the external memory. The link list manager block is configured to dispatch a command from the pending instruction entries in the internal memory to the transport layer.

Some embodiments described herein relate to a device for interfacing a computer to other network or storage devices. Some embodiments described herein relate to a controller block for use in a device for interfacing a computer to other network or storage devices. Some embodiments relate to a controller block for a host bus adapter (HBA). Some embodiments relate to methods and architectures of SAS/SATA controller blocks. Some embodiments relate to controller blocks for RoC servers. Some embodiments relate to controller blocks for enterprise storage systems. Other embodiments relate to RAID controllers. Some embodiments relate to a RAID on chip (RoC) controller. Some embodiments disclosed herein relate to Link List Based SAS Target Queues with Dispatcher Cache.

For simplicity and clarity of illustration, reference numerals may be repeated among the figures to indicate corresponding or analogous elements. Numerous details are set forth to provide an understanding of the embodiments described herein. The example embodiments may be practiced without these details. In other instances, well-known methods, procedures, and components have not been described in detail to avoid obscuring the embodiments described. The description is not to be considered as limited to the scope of the example embodiments described herein.

Some embodiments described herein relate to methods and architectures of SAS/SATA controller block (SAS block) in a SOC (System on Chip) RAID controller device or host bus adapter device. The SAS block implements SAS PHY, LINK, PORT and TRANSPORT layers. It can have multiple SAS links and ports connecting to remote devices, such as other controllers disk drives, or flash drives. For enterprise graded controllers, it can support up to thousands of remote devices, and a few thousands of concurrent IO. On the other side of the SAS block, it communicates with DMA (Direct Memory Access) engines to read or write data from host memory.

With some of the traditional SAS controllers managing command and data requests for multiple targets using queuing mechanism, once a request is dispatched to a SAS link, there is no easy way to revert back the request to the queue in the same order due to the FIFO nature. This back off mechanism is especially important because of the connection oriented nature SAS/SATA protocol. The back off conditions could include but is not limited to long OPEN_REJECT from drives, connections being closed in the middle of transfer, data not ready from host etc.

Some embodiments described herein relate to architecture to efficiently arrange command and data requests. Although the primary applications of some of the embodiments disclosed herein are for the SAS block, they can be applied to other systems with similar characteristics of SAS/SATA protocol.

Serial Attached SCSI (SAS) and Serial ATA (SATA) standards are governed by the standard body T10. T10 is a Technical Committee of the InterNational Committee on Information Technology Standards (INCITS). The SAS/SATA protocol was introduced to improve computer storage systems. It addresses problems seen in parallel SCSI or parallel SATA, such as signal cross-talking, number of devices that can be connected, spaces for connectors, etc.

SAS/SATA protocol PHY layer performs out-of-band (OOB) signaling and 8b/10b encoding/decoding. It communicates with the Physical layer (physical wires) and the Link layer.

The Link layer defines Link state machine. It is responsible for primitive generation and detection. In addition, Link layer deals with connection opening and connection closing. It communicates with PHY layer and Port/Transport layer.

The Port/Transport layer is responsible for various functions, which include making decisions on how the PHYs are used in a port (wide or narrow), deciding when to open or close connections, fetching command or data frames from the host, assembling frames, transmitting frames from on chip memory, receiving frames to on chip memory, processing incoming frames and sending DMA requests out. It interacts with SSPA closely to achieve most of the link layer related functions. On the other side, transport layer communicates with vendor specific DMA engine or memory block to achieve data transfer functions. FIG. 1 shows a typical SAS block diagram of SAS/SATA controller.

SAS/SATA standard defines three transport protocols:
(1) Serial SCSI Protocol (SSP)—supports Serial SCSI devices, such as hard drives, tape drives, etc.
(2) Serial ATA Tunneling Protocol (STP)—supports Serial ATA devices, such as hard drives, flash drives etc. ATA traffic is tunneled through STP.
(3) Serial Management Protocol (SMP)—supports expander which is an interconnect between controller and remote devices.

Figure 2:
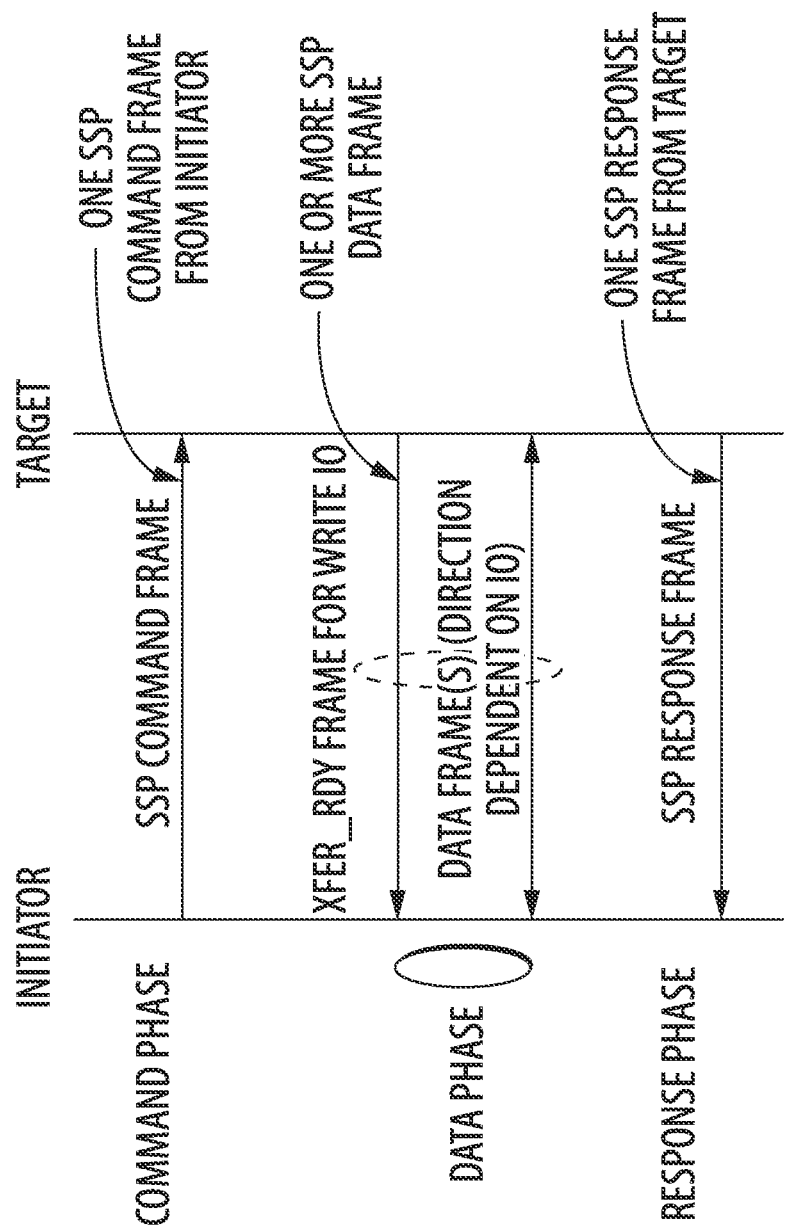
FIG. 2 is a flow diagram illustrating a typical SSP IO command.

As indicated in FIG. 2, a SSP IO starts with an initiator sending a SSP Command Frame to the target. Depending on whether it is a write command or a read command, the target could send back a XFER_RDY frame, or one or more Data Frame(s). The IO is considered finished when a target sends a Response Frame back to initiator.

There are variations for SATA protocol transfer. FIG. 3 shows the most common SATA commands, i.e. queuing commands (NCQ). The command phase starts with the host sending a Host-to-Device (H2D) Frame Information Structure (FIS), while the device sends a Device-to-Host (D2H) FIS. Depending on the IO direction, the device sends a DMA setup FIS followed by one or more Data FIS(es). The IO is considered finished when the device sends the host a Set Device Bits (SDB) FIS.

As indicated in FIG. 4, the SMP protocol starts with an initiator sending the target a SMP Request Frame. There is no data phase involved. The IO is considered finished when the target sends a SMP Response Frame.

In a typical SOC based controller system, the host (e.g. a RAID stack or a higher layer driver) initiates a host-command to the controller device. The host-command is processed by on-chip firmware and then the host-command is translated into a SAS command and is sent to the SAS block. The SAS command could be in one of SMP, SSP or STP (SATA) protocols. The hardware based SAS block takes the command, handles the command and data transfer, and responds back to the host when it is finished.

Figure 5:
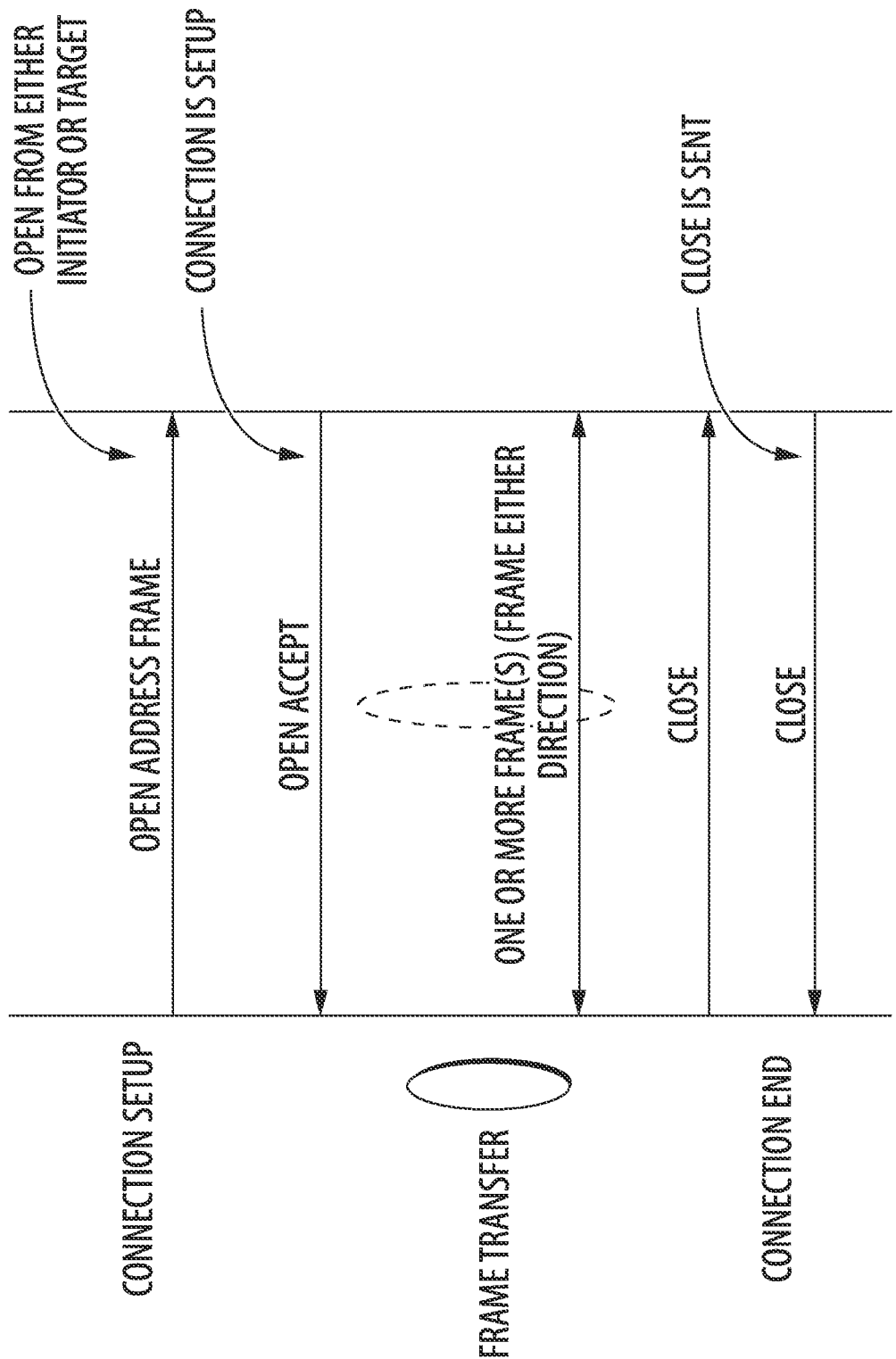
FIG. 5 is a flow diagram illustrating connection phases for a SAS IO command.

As illustrated in FIG. 5, in order to send frames, SSP, STP or SMP, the SAS block sends an OPEN frame to establish a connection (SSP, STP or SMP connection). An OPEN request is dispatched from Port/Transport layer to Link layer, then to PHY layer. Depending on the status of the remote device, a connection could be accepted or rejected. This could lead to a long sequence OPEN-OPEN_REJECT(RETRY) exchange between the controller and the remote device if it is not ready to accept more frames. Having architecture in the SAS block architecture that can easily have a request backed off and re-opened later can be an important feature for increasing efficiency of the SAS links.

Another important factor for SAS link efficiency can be to have the transport dispatcher decide which Link/PHY to have a request dispatched to. If at the time of dispatching a command or data frame(s), a remote device condition is known to the dispatcher that the SAS block should not send any frames to it, it could be beneficial for the controller to skip that device and move on to serve another device. In an enterprise grade controller, having the ability to scan through thousands of device requests and to pick an available device can be beneficial.

With traditional SAS controllers managing command and data requests for multiple targets using queuing mechanism, once a request is dispatched to a link, there is no easy way to revert back the request to the queue in the same order due to the FIFO nature. This creates inefficient use of the SAS links.

Even when the requests are managed in link-list fashion, it incurs overhead for the SAS engine to insert, delete or to traverse them. Firmware can be used to arrange and manage the link list. However, this option can sometimes be undesirable given that the overhead for managing it can prove to be very costly to performance.

Various embodiments described herein include a new link list with dispatcher cache architecture that addresses at least some of the issues of link usage efficiency. Some embodiments described herein reduce the overhead for link-list operations as compared to known methods and systems. Some embodiments described herein address at least some of the conditions described below. The conditions discussed below are examples only and are not intended to be limiting.

Some embodiments disclosed herein are configured for Open_Reject handling. For example, when an OPEN request is sent, a remote device can send retry-class OPEN_REJECT back to controller. In some embodiments, when this occurs, the controller retries the OPEN at a later time without blocking the link(s).

Some embodiments disclosed herein are configured for Fairness Control among Devices. For example, in some embodiments, in order to provide fairness, if a drive sends a large sized XFER_RDY frame or DMA_SETUP FIS, when the maximum connection timer expires in the SAS block, the request is backed-off. The SAS dispatcher then chooses another device to serve, so that the link is not monopolized by a single request for a long time. This helps to reduce the chance of the IO command being timed out which can increase efficiency given that a timed out IO generally is re-started.

Some embodiments disclosed herein are configured for SATA Atomic Sequence handling. In general, in the SATA protocol, when a drive is in an atomic sequence, the controller cannot send any new command to the device. In some embodiments described herein, when a particular device is in an atomic sequence, the SAS dispatcher skips that device and attempts to serve another device. This avoids a SATA FIS pending on the PHY and occupying the link while waiting for an atomic sequence to finish.

Some embodiments disclosed herein are configured for Maximum Number of Connection Handling. For example, in some embodiments, if the maximum number of connections allowed for a remote device is reached, the SAS dispatcher backs off the request and serves another device instead. This can avoid the link in question being occupied for a long time while receiving Arbitration In Progress (AIP) from the expander.

Some embodiments disclosed herein are configured for Duplex Operation. For example, in some embodiments, when a SAS PHY has an inbound connection and frames coming in, the SAS dispatcher leverages the inbound connection and attempts to send frames for that device. In this way, out-going connections can be reduced and hence performance can be improved.

Some embodiments disclosed herein are configured for Error Recovery. Some embodiments disclosed herein are configured for Error Recovery in terms of Port Availability. For example, in some embodiments, when a port is not available or is frozen intentionally by the host, the SAS dispatcher skips the device request(s) for that port and moves on to serve another port. Some embodiments disclosed herein are configured for Error Recovery in terms of IO termination. For example, in some embodiments, when the host terminates an IO command, the host freezes the request in the controller and has the dispatcher traverse the link list to remove an IO.

As will be understood by those skilled in the art, more conditions can easily be enhanced in the SAS block (dispatcher) to leverage the architecture of the embodiments described herein.

There have been other systems proposed that utilize link lists to arrange tasks. However, there are various issues that these systems did not address, such as for example:

Operations when linking a node and freeing a node, particularly on memory accesses to construct or destruct a link list entry.

Operations when an entry is in the middle of the link list needs to be backed off. Some previous proposed systems only specify re-inserting at top or bottom of link list. However, this would not address the situation where for example for wide port targets there are cases which a middle entry needs to be put back into the link list after dispatching.

The SAS/SATA back off conditions that can take advantage of link list based SAS block.

In addition, known systems and previously proposed systems do not address the problem of manipulating the link list in a big system. In a typical SAS/SATA controller, the number of nodes (command or data request) could reach over 10,000. One of the most important metrics of measuring the performance of a SAS/SATA controller is IO per second that a controller can handle. To implement this, a substantial amount of link lists and remote nodes in hardware may be used in addition to a lot of memory accesses for manipulating the link lists and this could lead to a big performance problem.

The performance issue becomes worse when SAS/SATA transfers are backed off from the link, which is very common due to SAS's connection nature. Known systems and previously proposed systems do not address this issue. For example, if a known system only specifies that any retry goes back to the link list, the lack of information regarding how to handle a back off efficiently can seriously affect the performance.

Some known systems disclosed a mechanism for transport layer retry (TLR) in SAS initiator. Such systems disclosed circuit designs for TLR in SAS. They focused on the structure for a task node, called IO Context, and how the SAS controller operates when TLR happens. However, such systems did not disclose how to back off the link efficiently. The main focus of such systems was on what the structure looked like for an IO command such that it can support TLR.

Figure 6:
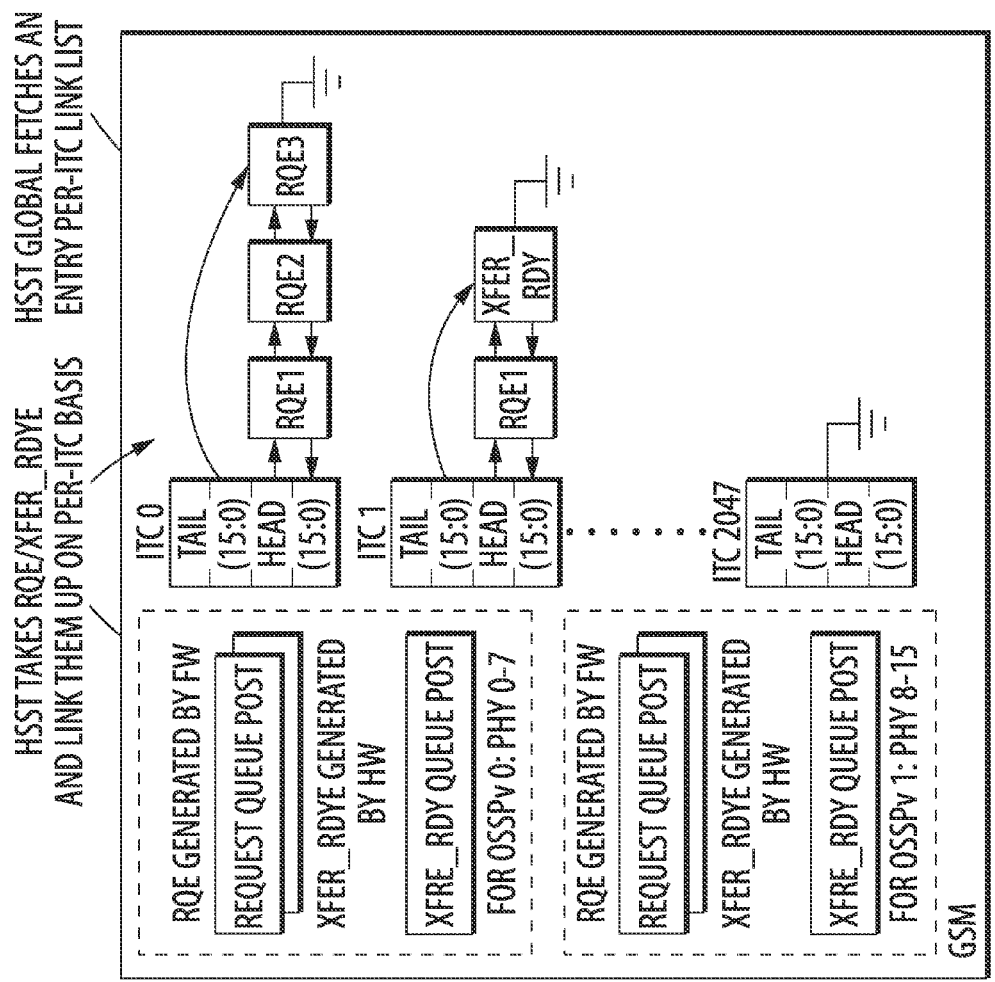
FIG. 6 is a block diagram of an a SAS block with an external shared memory according to various embodiments.

FIG. 6 illustrates a block diagram of the architecture of a SAS block with an external shared memory according to various embodiments.

The architecture utilizes a shared memory, referred to as a Global Shared Memory or GSM. The GSM stores queues that are setup by firmware for command or data requests. The GSM includes memory that stores information pertaining to remote devices. For example, in some embodiments, each remote device is represented by an Initiator-Target Context (ITC) that is stored in the GSM. Inside the ITC, the remote device information, such as connection rate, SAS address, are stored. There is also a head pointer and tail pointer to the link list to support link list operations.

The SAS block (OSSPv—Octal SAS/SATA Port Sub-system) contains several sub-blocks. The, Link List Manager (LLM), Link List Dispatcher (LLD) and Dispatcher Cache are responsible for linking new link list entries, dispatching the entries to each slice and keeping track of the entries in dispatcher cache. HSST refers to the Hardened SAS/SATA Transport. It implements the transport and port layer for SAS/SATA. Each Slice (Transport Slice) in turn contains a block for Transport layer, Link layer and PHY layer block. The Transport layer assembles frames and makes a connection request. Link layer manages SAS link layer primitive functions while PHY layer implements SAS PHY layer 8B/10B encoding and SAS speed negotiation.

When a command is issued by the firmware, the firmware simply puts a request entry (RQE) into a queue. LLM fetches the RQE and inserts to the end of the corresponding link list. The head/tail pointer in the ITC is updated. In addition, RQE includes a next and previous pointer, which is updated when it is added to the link list. A one bit per ITC (active ITCv) vector is updated when there is an entry in the link list. This vector is stored inside the Link List Manager and is used by Dispatcher to quickly identify which device has pending entry. In some embodiments, the entries can be referred to as instruction entries.

The Link List Dispatcher (LLD) scans through the Active ITC Vector (ITCv) to search for a device that has pending entry. Once it is found, it loads the RQE and then picks proper PHY to dispatch that entry. The transport slice then takes the RQE and creates the necessary frames to pass to Link layer. Link layer sends OPEN frame to PHY and once connection is accepted, it sends the frames out through the PHY to the remote device. When the transfer is done, the connection is closed.

Some embodiments described herein include transport layer architecture that can handle the conditions discussed above. Some embodiments described herein reduce the number of memory accesses when manipulating each link list such as for example when adding a request entry to link list, removing a request entry from link list or backing off an entry from transport slice.

Link List Components

As shown in FIG. 6, in some embodiments, each remote device is represented by a link list. In various embodiments, each link list represents the instructions that have been issued in relation to that device. Each node in a link list has a previous pointer and a next pointer. Various embodiments described herein leverage the link list, and arrange requests as nodes of a link list. Each of the nodes occupies a piece of memory in the system. Most of the information inside the node relates to information about the device, this type of information is often referred to as "functional". However, each node also has embedded in it pointers that are used to chain up a link list.

Initiator-Target Context (ITC)

In some embodiments, an ITC is created for each remote device. It contains information about the remote device, such as SAS address, connection rate, nexus time etc. The information in the ITC is filled in any appropriate manner such as, for example, during the discovery process as defined in SAS specification. Inside the ITC table, there are two pointers storing the addresses of the head entry and the tail entry of a link list. ITC serves as the root entry of a link list.

Figure 7:
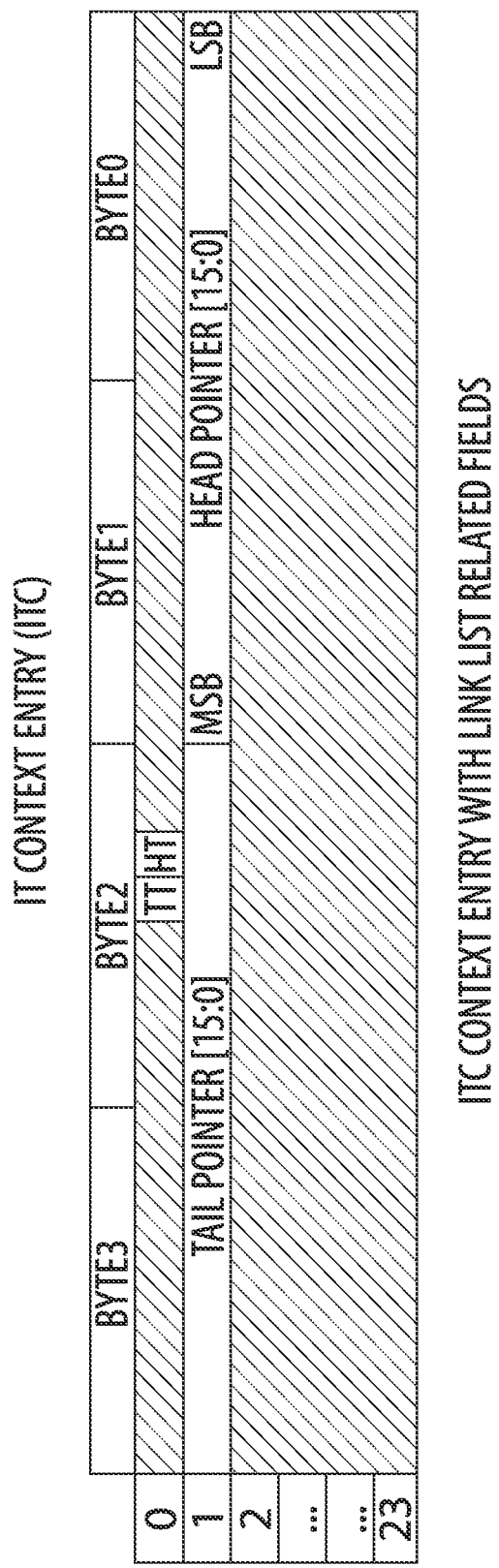
FIG. 7 is a diagram of an ITC Context Entry with Link List related fields according to various embodiments.

FIG. 7 is a diagram of an ITC entry which shows only the fields that are related to the link list design according to various embodiments. Other unrelated fields are hidden. Some of the fields include Head Pointer, Tail Pointer, HT (Head Type), and TT (Tail Type).

Head Pointer stores the address of the head entry.

Tail Pointer stores to the address of the tail entry.

HT—Head Type defines whether the head is a RQE or XFER_RDYE

TT—Tail Type defines whether the tail is a RQE or XFER_RDYE

In some embodiments, when an entry is added to or removed from the link list, the Link List Manager updates the head/tail pointers as well as the associated types.

Request Queue Entry (RQE)

In some embodiments, a RQE is setup by on-chip firmware when a host command is received. Firmware processes the host command and creates a RQE to ask the SAS block to send a frame, such as command frame in SSP, request frame in SMP or H2D FIS in STP. Information such as protocol, frame type, and SAS CDB are filled in a RQE. Embedded in a RQE are the next pointer and the previous pointer to help construct a link list.

Figure 8:
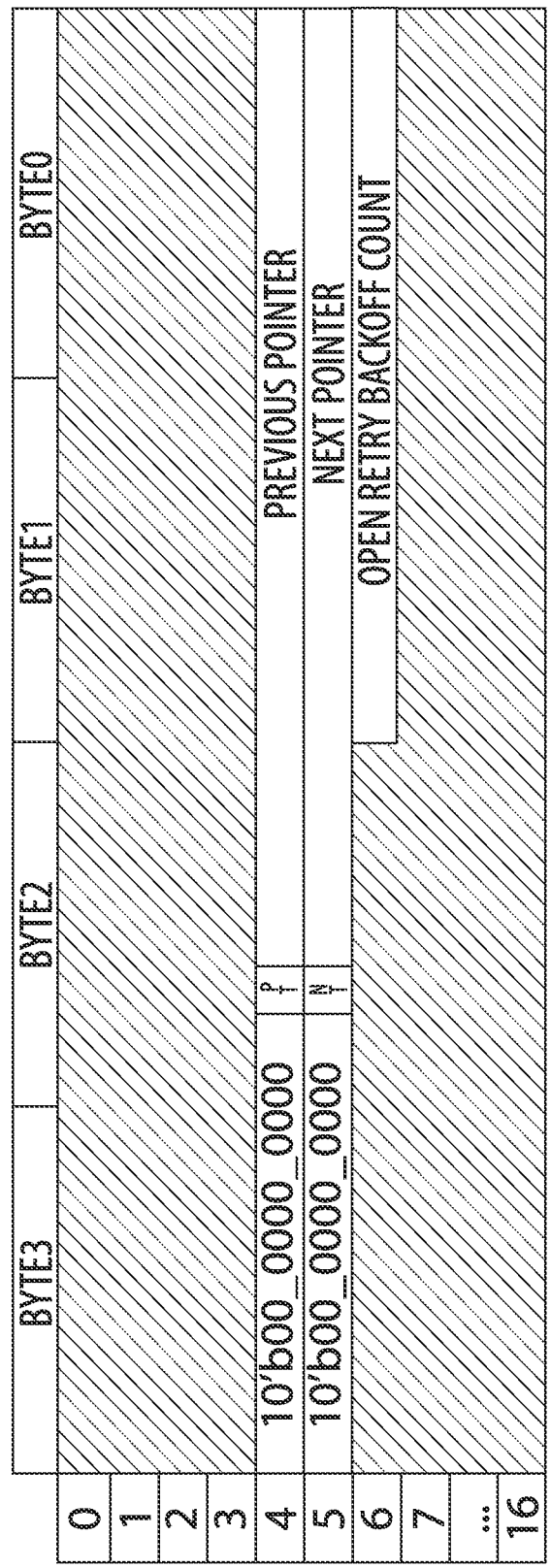
FIG. 8 is a diagram of a Request Queue Entry with Link List related fields according to various embodiments.

FIG. 8 illustrates a RQE which shows only the fields that are related to the link list design according to various embodiments described herein. Other unrelated fields are hidden. Some of the fields include Previous Pointer, Next Pointer, PT (Previous Type), and NT (Next Type).

Previous Pointer stores to the address of the previous entry in the link list

Next Pointer stores the address of the next entry in the link list

PT—Previous Type defines whether the previous entry is a RQE or XFER_RDYE

NT—Next Type defines whether the next entry is a RQE or XFER_RDYE

When an entry is added to or removed from the link list, the Link List Manager may update the next and/or previous pointers as well as the associated types.

XFER_RDY Entry (XFER_RDYE)

Figure 9:
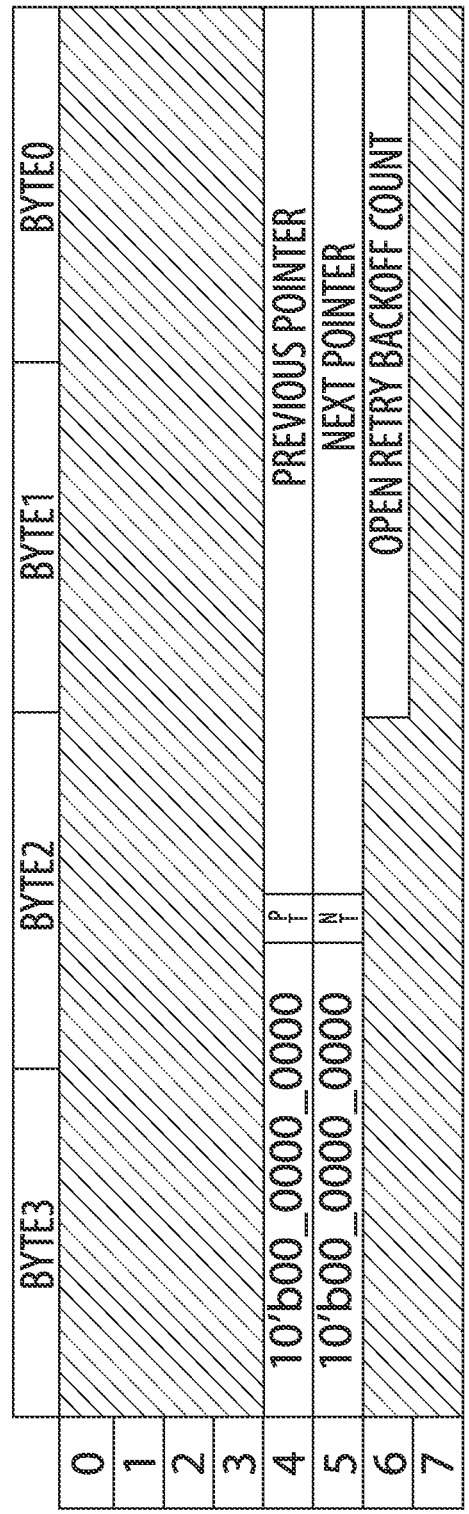
FIG. 9 is a diagram of a XFER_RDY Entry with Link List related fields according to various embodiments.
Figure 10:
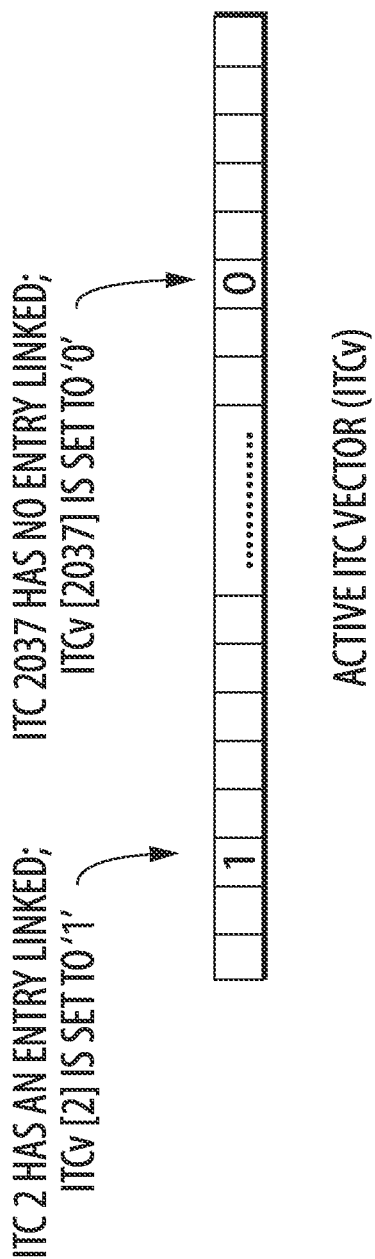
FIG. 10 is a schematic diagram of an active ITC vector according to various embodiments.

FIG. 9 illustrates a XFER_RDY Entry (XFER_RDYE). A XFER_RDYE is setup by transport layer receive side logic when a XFER_RDY in SSP or DMA SETUP FIS in SATA is received. The XFER_RDYE is created for transport layer transmit side logic to send data frames out to remote devices. Information such as protocol, frame type, tag number are filled in a XFER_RDYE. Embedded in a XFER_RDYE are the next pointer and the previous pointer of a link list entry.

Active ITC Vector (ITCv)

The Active ITC vector (ITCv) keeps track of which ITC has a pending RQE or XFER_RDYE. In some embodiments, each bit in the ITCv indicates whether the ITC has any entry linked to it. One of the reasons that various embodiments include such a vector is to improve the link list dispatcher performance. In various embodiments, the link list dispatcher scans through the ITCv and therefore does not need to load an ITC entry to determine whether there is pending request for that entry.

When the ITC link list goes from empty to non-empty, Link List Manager sets the corresponding bit in the Active ITC vector. When the Active ITC vector is not empty, the link list dispatcher reads the ITCv. If an ITCv bit indicates that there is an entry linked, then the link list dispatcher loads the ITC and traverses the link list to dispatch a RQE or XFER_RDYE to one of the transport slices.

General Shared Memory (GSM)

In various embodiments, the above structures (ITC, RQE, XFER_RDYE) are stored in an external centralized memory block called GSM. The use of structures that are stored outside of the SAS block in a centralized area can have some advantage. Two examples of possible advantages include:

(1) Avoidance of bottlenecking. For example, both firmware (on-chip processor) and hardware (SAS transport) need to access these structures frequently. Accordingly, having these structures in shared memory can avoid bottlenecking the processor accesses at the interface of the SAS block; and (2) Flexibility for adapting to various applications. For example, in order to support a number of devices, there are typically thousands of these structures inside a controller. As such, having an external memory block provides flexibility when the size of the memory block needs to be increased/decreased to adapt to different applications. For example, if a new application emerges that requires a system that only needs half the ITC number of that is utilized by a current system, the new system can be created from the old system by simply halving the external memory and without changing any internal logic in the SAS block.

As with any external memory storage, the GSM incurs latency for each access. In some embodiments, the average latency to read or write to the structure is 16 clock cycles. As a result, in some such embodiments, link list manipulations, such as inserting, deleting, traversing, and searching, are designed to be limited and efficient. The following sections describe the operation of the Link List Manager and the associated Dispatcher Cache.

Reference is now made to FIG. 11 which is a schematic diagram of SAS block and GSM according to various embodiments. In some embodiments, the context memories as well as the queues are all located inside the GSM. SAS block communicates with GSM via several AXI ports.

Link List Manager

Link List Manager (LLM) is a block in Transport layer that manages the ITC link list. In various embodiments, LLM performs the following functions:

Read RQE or XFER_RDYE from the Request Queue(s) or XFER_RDY Queue,

Insert RQE or XFER_RDYE to the respective ITC link list, (3), Drop RQE or XFER_RDYE when remote device (ITC) is removed (this corresponds to 1246 of FIG. 12), (4) Manage the Active ITC vector, (5) Remove RQE or XFER_RDYE after command or data is sent, (6) Update Dispatcher Cache when an entry is freed or backed-off.

Figure 12:
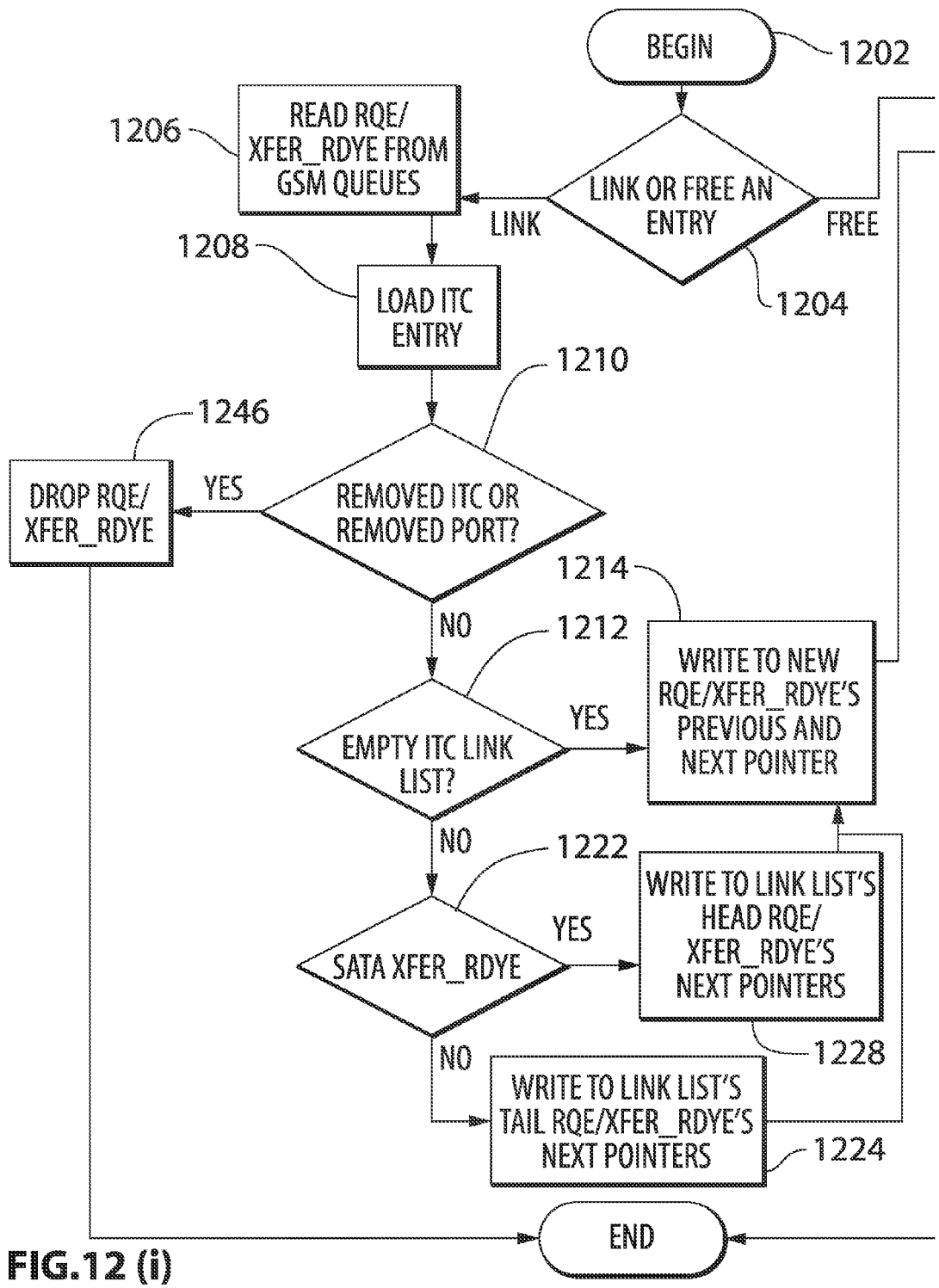
FIG. 12 is a flow chart diagram of a process executed by the Link List Manager according to various embodiments.

FIG. 12 illustrates a logic flow chart of a process executed by the LLM. The LLM flow chart has two main paths. The first one is for linking new RQE/XFER_RDYE. The second one is for freeing RQE/XFER_RDYE. In order to improve performance, one of the objectives for LLM is to save link list pointer accesses through external GSM. As such, link list traversal must be minimized. The following sections describe the link list operations.

Insertion

When a new RQE is posted by FW or XFER_RDYE is posted by HW, LLM fetches the entry and organizes the entry to the corresponding ITC link list in preparation for dispatching later. Other than SATA XFER_RDYE, the new entries are linked to the tail of link list.

Inserting RQE/XFER_RDYE into Empty Link List

Figure 13:
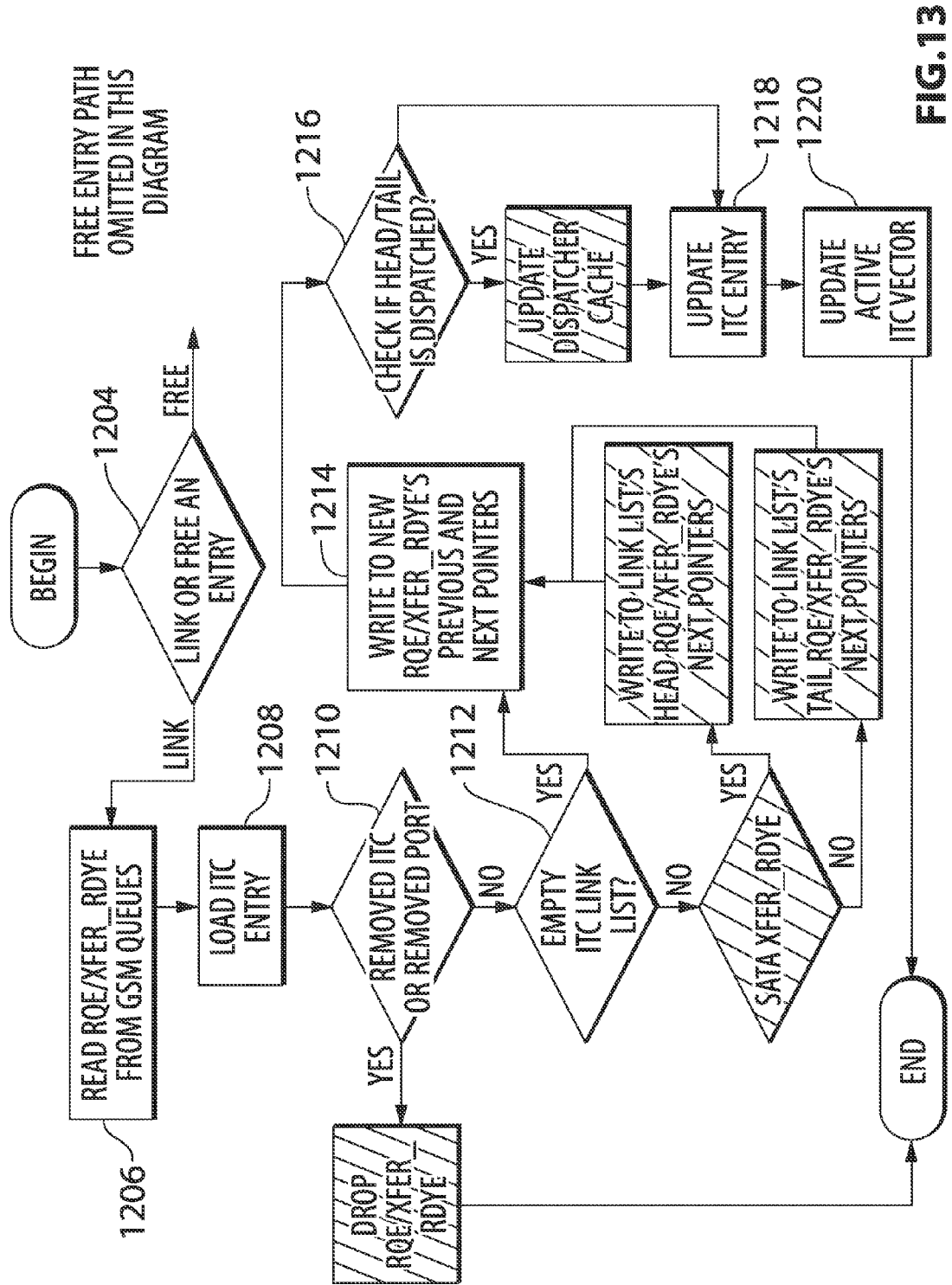
FIG. 13 is a flow chart diagram illustrating a portion of the process illustrated in FIG. 12 corresponding to insertion of a RQE into an empty link list.
Figure 14:
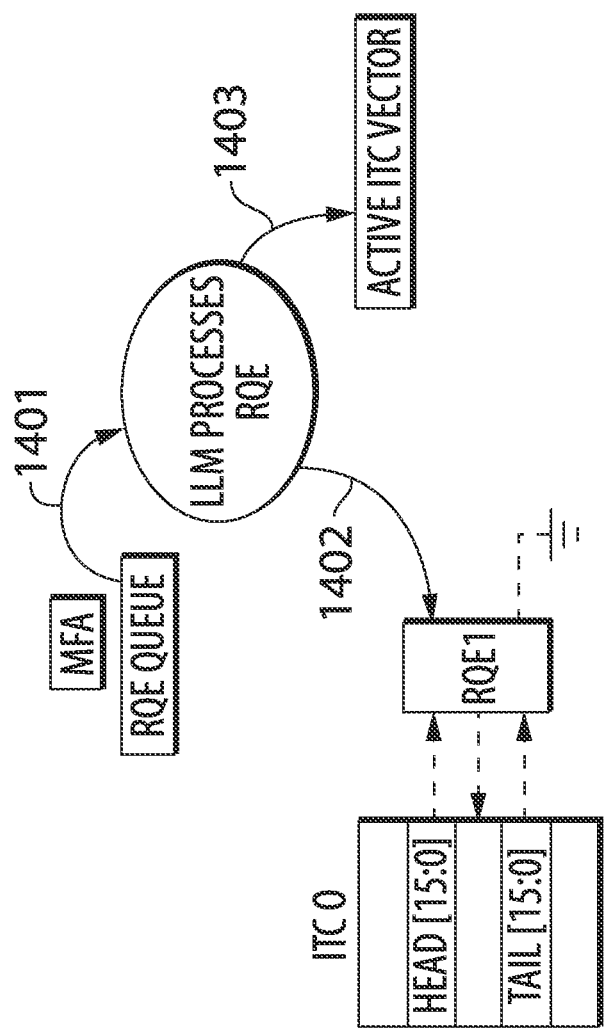
FIG. 14 is a flow diagram illustrating the steps involved in adding a RQE to an empty Link List according to various embodiments.

FIG. 13 illustrates the process for linking a RQE into an empty link list. FIG. 14 is a schematic diagram of a process of adding a RQE to an Empty Link List.

Prior to the LLM taking action, the firmware (FW) prepares a RQE for an SAS IO. The address pointer, called Message Frame Address (MFA), of the RQE is posted to GSM queues. The ITC index is written in upper bits of RQE's MFA.

At 1204, the LLM determines that an entry is to be linked. At 1206, LLM reads an RQE MFA from the GSM queue (1401). At 1208, LLM loads the ITC entry's head and tail pointers. At 1210, the LLM determines that the ITC or Port has not been removed. At 1212, the LLM determines that the link list is currently empty.

LLM links the RQE MFA to the respective ITC (1402). This is done by:

At 1214, the LLM writes null pointers (0xFFFF) to new RQE's previous pointer and next pointer to indicate there is no previous/next entry.

At 1216, the LLM determines if the head/tail have already been dispatched. If not, then at 1218 the ITC is updated by writing the new RQE's MFA to ITC head and tail pointer. This indicates the new RQE is the only entry.

At 1220, the ITC vector is updated. When the ITC link list goes from empty to non-empty, LLM sets the corresponding bit in the Active ITC vector in GSM (or in local cache). This vector is used later on by the dispatcher to look up which ITC has pending RQE entries (1403).

Number of GSM Accesses

Through the above described process, a new RQE is connected to the tail of an empty link list. In some embodiments, the active ITC vector is located internally to LLM. In some embodiments, there are only three accesses (read or write) to external memories in GSM: (1) Read the ITC head and tail pointer (2) Write null pointers (0xFFFF) to the new RQE's previous pointer and next pointer; and (3) Write RQE's MFA to ITC entry's head and tail pointers.

Inserting RQE/XFER_RDYE to the Tail of an Non-Empty Link List

Figure 15:
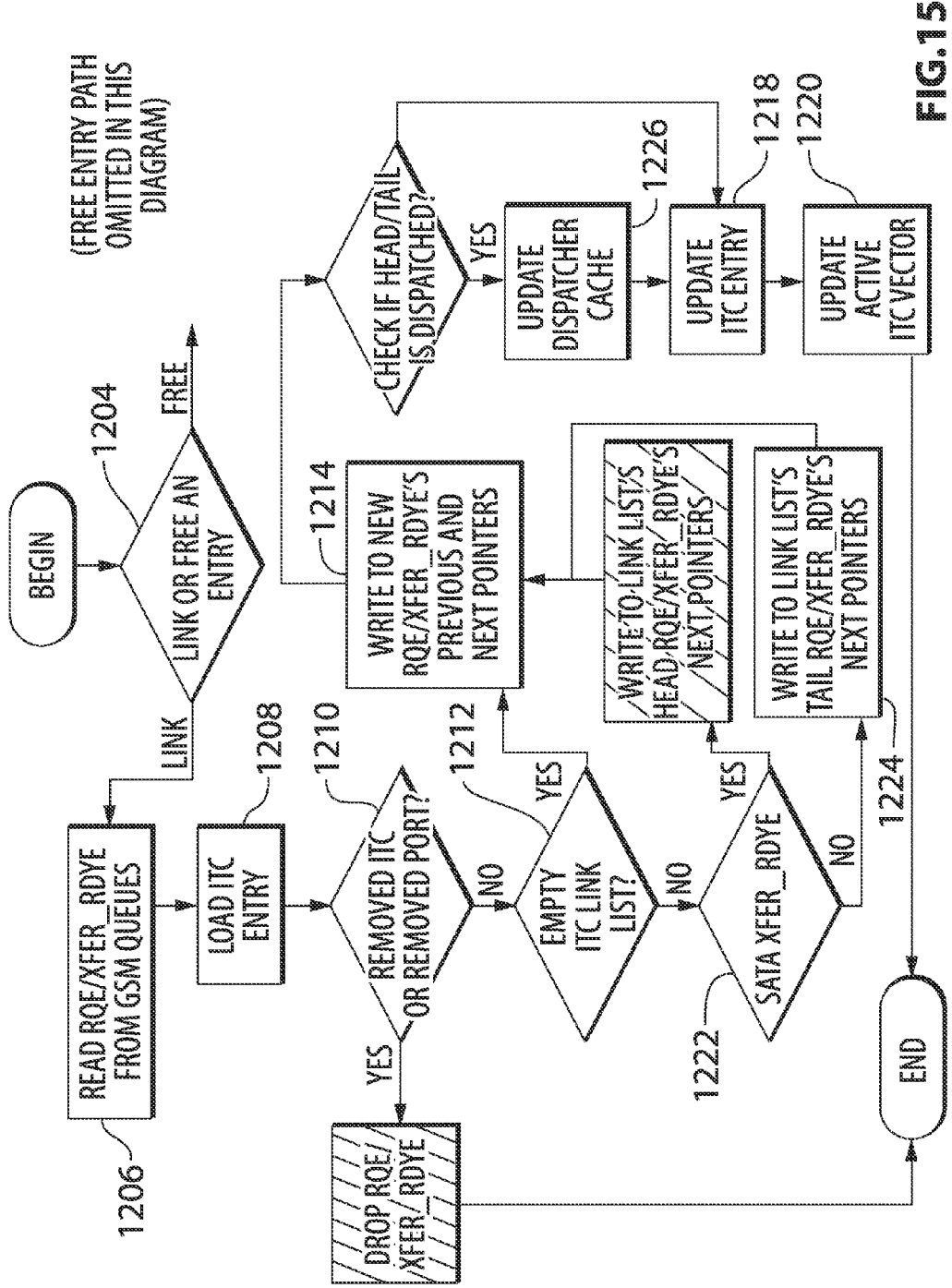
FIG. 15 is a flow chart diagram illustrating a portion of the process illustrated in FIG. 12 corresponding to insertion of a RQE into a non-empty link list.
Figure 16:
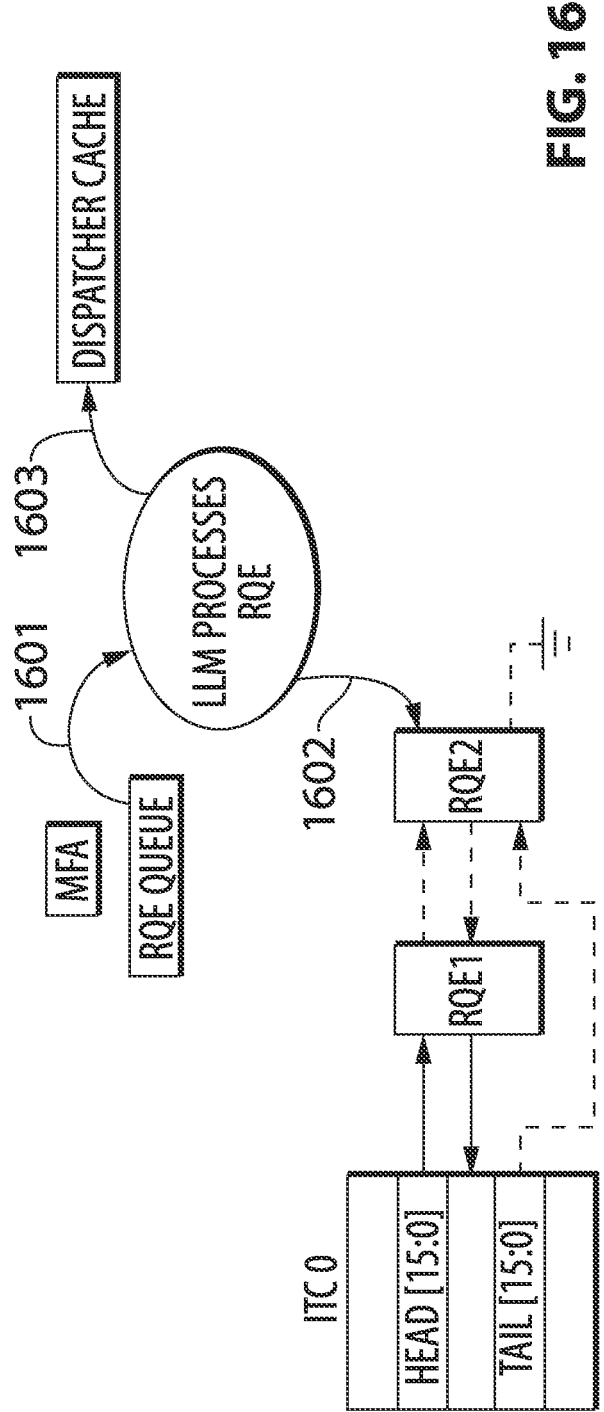
FIG. 16 is a flow diagram illustrating the steps involved in adding a RQE to a non-empty Link List according to various embodiments.

FIG. 15 illustrates the linking of a RQE into a non-empty link list. FIG. 16 is a schematic diagram of process of adding the RQE to the tail of a non-empty link list.

Prior to the LLM taking action, the FW prepares a RQE for an SAS IO. The address pointer, called Message Frame Address (MFA), of the RQE is posted to GSM queues. The ITC index is written in upper bits of RQE's MFA.

At 1204, the LLM determines that an entry is to be linked.

At 1206, LLM reads an RQE MFA from the GSM queue (1601).

At 1208, LLM loads the ITC entry's head and tail pointers.

At 1210, the LLM determines that the ITC or Port has not been removed.

At 1212, the LLM determines that the link list is not empty.

At 1222, the LLM determines that there is no SATA XFER_RDYE.

LLM links the RQE MFA to the respective ITC (1602). This is done by:

At 1224 and 1214, the LLM writes a null pointer (0xFFFF) to the new RQE's next pointer and the tail pointer of ITC to RQE's previous pointer.

At 1216, the LLM determines if the head/tail have already been dispatched by checking the dispatcher cache. If so, then at 1226, the LLM updates the dispatcher cache (1603). This will be described in further detail below. At 1218 the ITC is updated by writing the new RQE's MFA to the ITC tail pointer. This indicates that the new RQE is at the tail of the ITC link list.

At 1220, the ITC vector is updated. When the ITC link list goes from empty to non-empty, LLM sets the corresponding bit in the Active ITC vector in GSM (or in local cache). This vector is used later on by the dispatcher to look up which ITC has pending RQE entries.

Number of GSM Accesses

Through the above process, new RQE2 is connected to the tail of a non-empty link list. In some embodiments, the dispatcher cache is located internally to LLM. The cache is checked and updated if necessary. In some embodiments, there are only four accesses (read or write) to external memories in the GSM: (1) Read the ITC head and tail pointer; (2) Write null pointers (0xFFFF) to new RQE2's next pointer and RQE1's MFA to RQE2's previous pointer; (3) Write RQE2's MFA to RQE1's next pointer; and (4) Write RQE2's MFA to ITC entry's tail pointer.

Inserting SATA XFER_RDYE to the Head of Link List

When a SATA DMA setup FIS (for NCQ), PIO setup FIS or DMA Activate FIS (non-NCQ) is received, an XFER_RDYE is created by transport layer and put into XFER_RDY queue for dispatching later. The SATA FIS handling respective to link list is different from SAS RQE/XFER_RDYE or SATA RQE. The LLD dispatches entries in a link list in order, starting from MFA in head pointer. However, SATA has a special way of handling it is data phase, called data atomic sequence. A data atomic sequence states that when the data phase is started, indicated by a drive sending DMA Setup FIS/PIO Setup FIS or DMA Activate FIS, the host must not send any new command to the drive. As a result, a SATA XFER_RDYE entry must be linked to the head of the link list, taking priority over other commands already linked.

Figure 17:
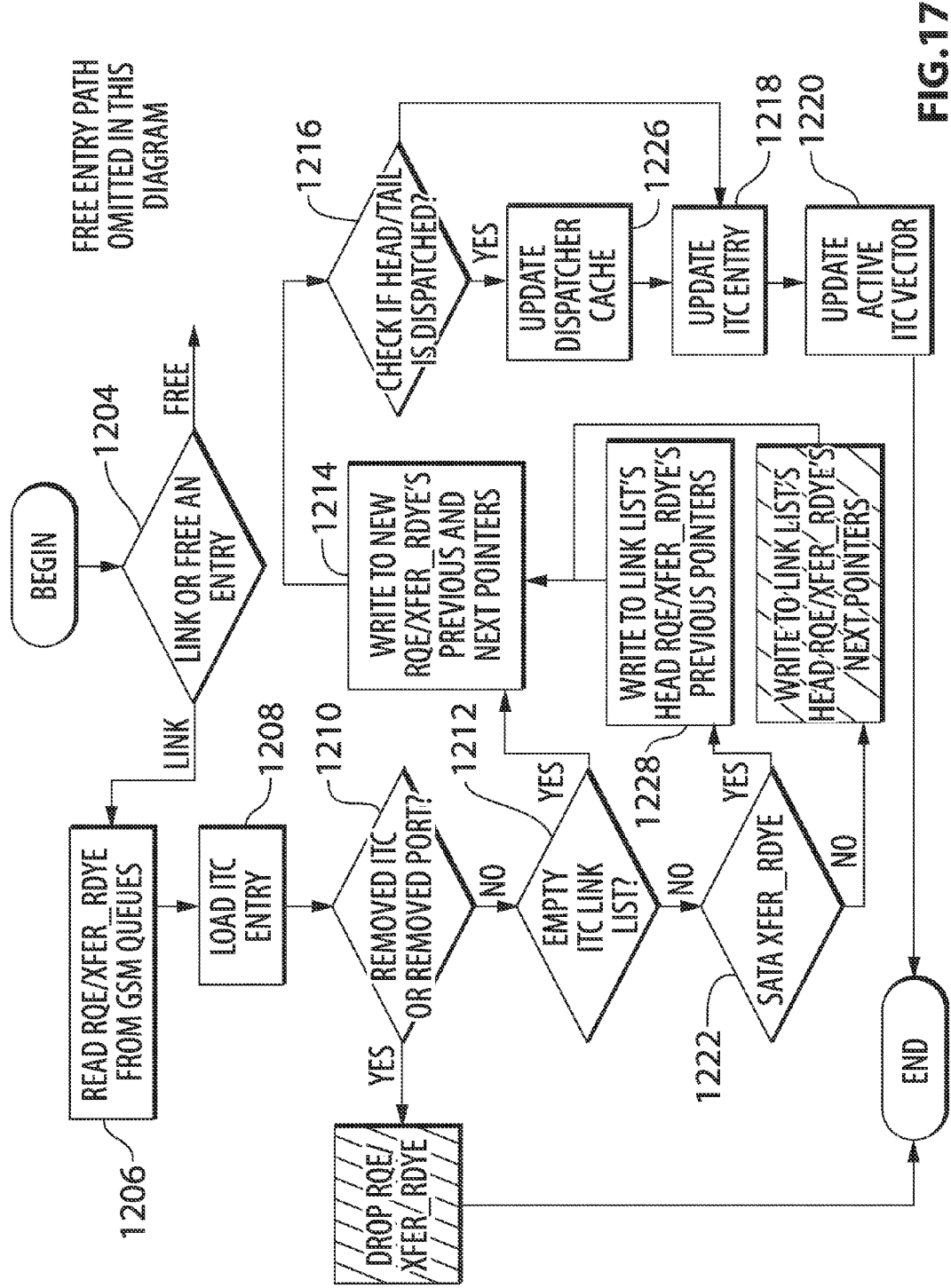
FIG. 17 is a flow chart diagram illustrating a portion of the process illustrated in FIG. 12 corresponding to insertion of a SATA XFER_RDYE into a link list.
Figure 18:
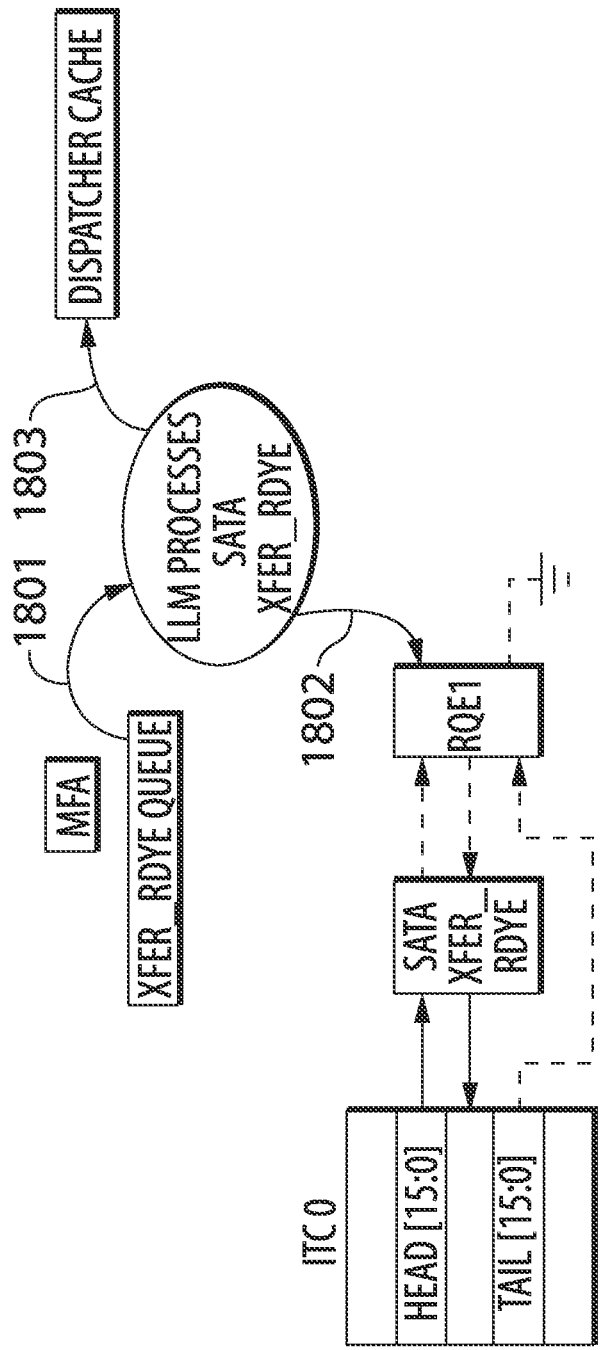
FIG. 18 is a flow diagram illustrating the steps involved in adding a SATA XFER_RDYE to a non-empty Link List according to various embodiments.

FIG. 17 illustrates the process for linking a SATA XFER_RDYE into a non-empty link list. FIG. 18 is a schematic diagram of a process of adding a SATA XFER_RDYE to the Head of a non-empty link list.

Prior to the LLM taking action, Receive logic in Transport layer prepares a XFER_RDYE for an SATA IO. The address pointer, called Message Frame Address (MFA), of the XFER_RDYE is posted to GSM queues. The ITC index is written in upper bits of XFER_RDYE's MFA.

At 1204, the LLM determines that an entry is to be linked.

At 1206, LLM reads a XFER_RDYE's MFA from the GSM queue (1801).

At 1208, LLM loads the ITC entry's head and tail pointers. At 1210, the LLM determines that the ITC or Port has not been removed. At 1212, the LLM determines that the link list is currently not empty.

At 1222, LLM determines that this is a XFER_RDYE.

LLM links the XFER_RDYE's MFA to the respective ITC (1802). This is done by:

At 1228 and 1214, the LLM writes a null pointer (0xFFFF) to the new XFER_RDYE's previous pointer and the head pointer in ITC to XFER_RDYE's next pointer. The original head entry now becomes the second entry following XFER- _RDYE. The LLM also writes the XFER_RDYE's MFA to the original head entry's previous pointer.

At 1216, the LLM checks the dispatcher cache to see if the original head entry is dispatched. If so, then at 1226, the LLM updates the dispatcher cache (1803). At 1218 the ITC is updated by writing the new XFER_RDYE's address to ITC head pointer. This indicates the new XFER_RDYE is at head of the ITC link list.

At 1220, the ITC vector is updated. When the ITC link list goes from empty to non-empty, LLM sets the corresponding bit in the Active ITC vector in GSM (or in local cache). This vector is used later on by the dispatcher to look up which ITC has pending RQE entries (3).

Number of GSM Accesses

Through the above process, new XFER_RDYE is connected to the head of non-empty link list. In some embodiments, the dispatcher cache is located internally to LLM. The cache is checked and updated if necessary. In various embodiments, there are only four accesses (read or write) to external memories in GSM: (1) Read the ITC head and tail pointer; (2) Write null pointers (0xFFFF) to new XFER_RDYE previous pointer and RQE1's MFA to XFER_RDYE's next pointer; (3) Write XFER_RDYE's MFA to RQE1's previous pointer; and (4) Write XFER_RDYE's MFA to ITC entry's head pointer.

Removal

After a RQE or XFER_RDYE is processed by the transport slice and the frame(s) are sent, the entry is freed up. LLM takes the free request from transport slice and re-organizes the link list. The operations vary when freeing an entry at head/tail or freeing in the middle of the link list. In addition, LLM may update the active ITC vector and dispatcher cache if appropriate.

Removing Only RQE/XFER_RDYE from Link List

Figure 19:
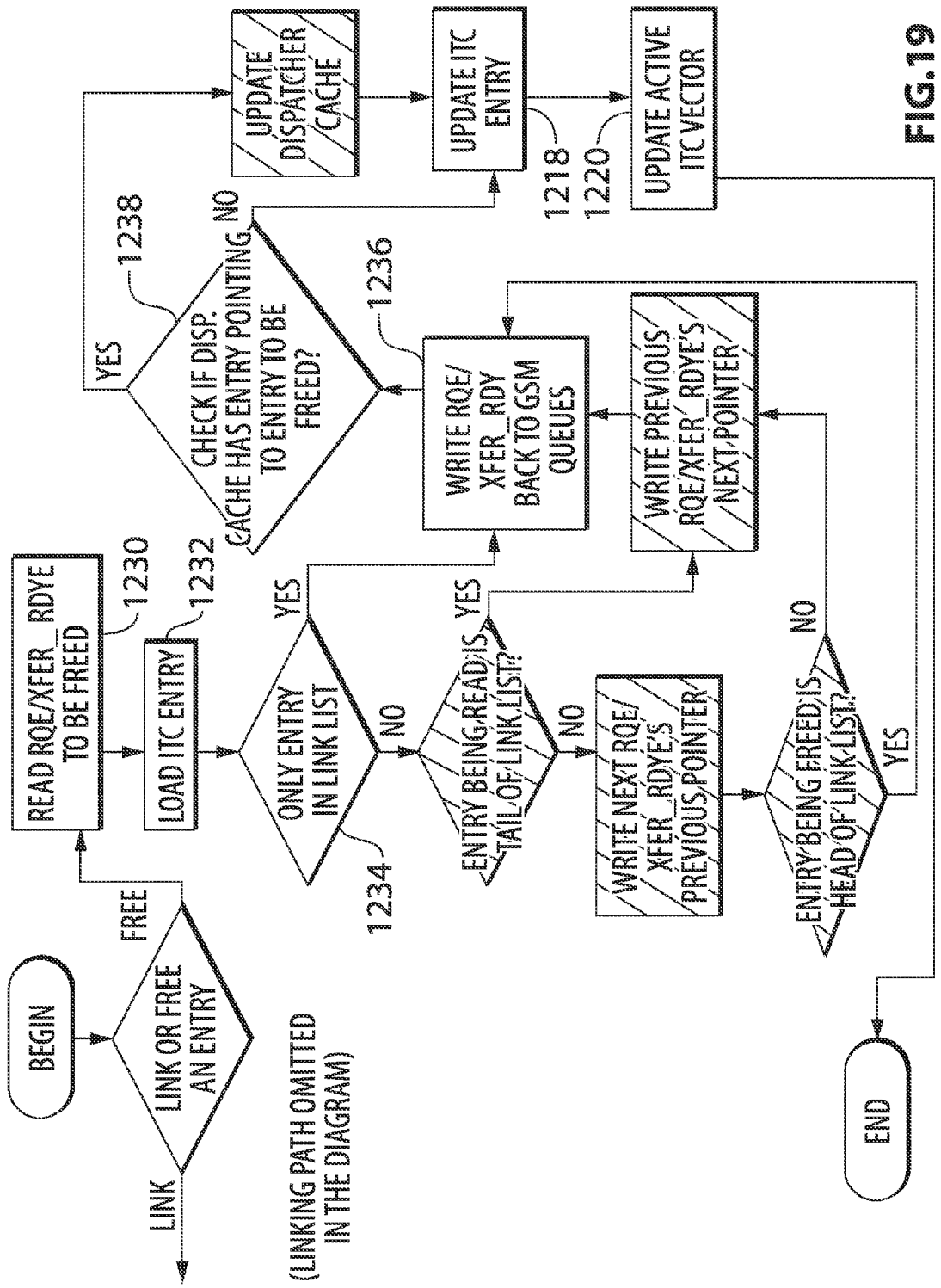
FIG. 19 is a flow chart diagram illustrating a portion of the process illustrated in FIG. 12 corresponding to removal of the last RQE from a link list.
Figure 20:
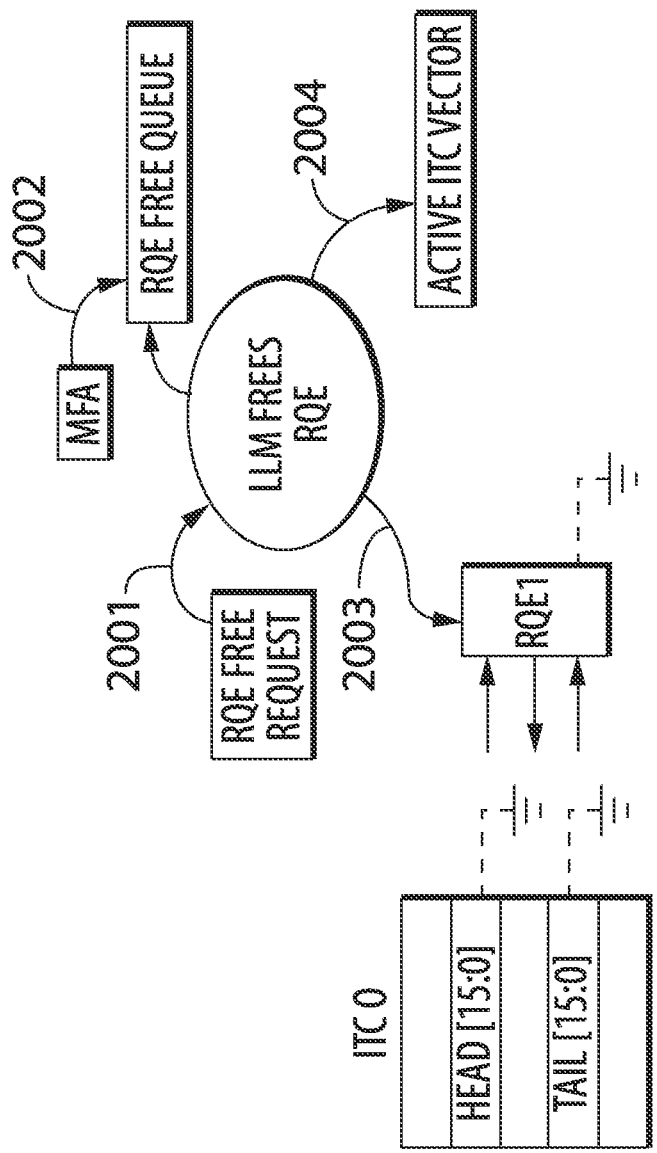
FIG. 20 is a flow diagram illustrating the steps involved in removing the last RQE from a Link List according to various embodiments.

FIG. 19 illustrates the process for removing the only RQE from link list. FIG. 20 is a schematic diagram of a process of removing the last RQE from the link list.

When the transport slice is finished processing an RQE, it requests LLM to free the entry at 1204.

At 1230, the ITC number is passed along with the MFA from Transport slice to LLM.

At 1232, LLM loads the ITC entry's head and tail pointers.

At 1234, LLM identifies that the link list has only one entry to free (2001).

At 1236, LLM writes the RQE entry to be freed to the RQE queue so that the entry could be re-used (2002).

At 1238, LLM determines that that the cache does not have an entry pointing to an entry that is to be freed (2003).

At 1218 LLM updates ITC head and tail pointer by writing null (0xFFFF) to both fields.

At 1220, the LLM updates the Active ITC vector. When the ITC link list goes from non-empty to empty, LLM clears the corresponding bit in the Active ITC vector. This vector is used later on for dispatcher to look up which ITC has pending RQE entries (2004). Since there is no entry in the link list, LLD would skip this ITC instead of loading the ITC and traversing the link list to find that there is not an entry.

Number of GSM Accesses

Through the above process, an RQE is removed from the link list. The dispatcher cache does not need to be updated as this is the only entry in the link list. In various embodiments, there are only three accesses (read or write) to external memories in GSM: (1) Read the ITC head and tail pointer; and (2) Write RQE back to RQE Free Queue; (3) Write null pointers (0xFFFF) to ITC head and tail pointers.

Removing RQE/XFER_RDYE at the Head/Tail of Link List

Figure 21:
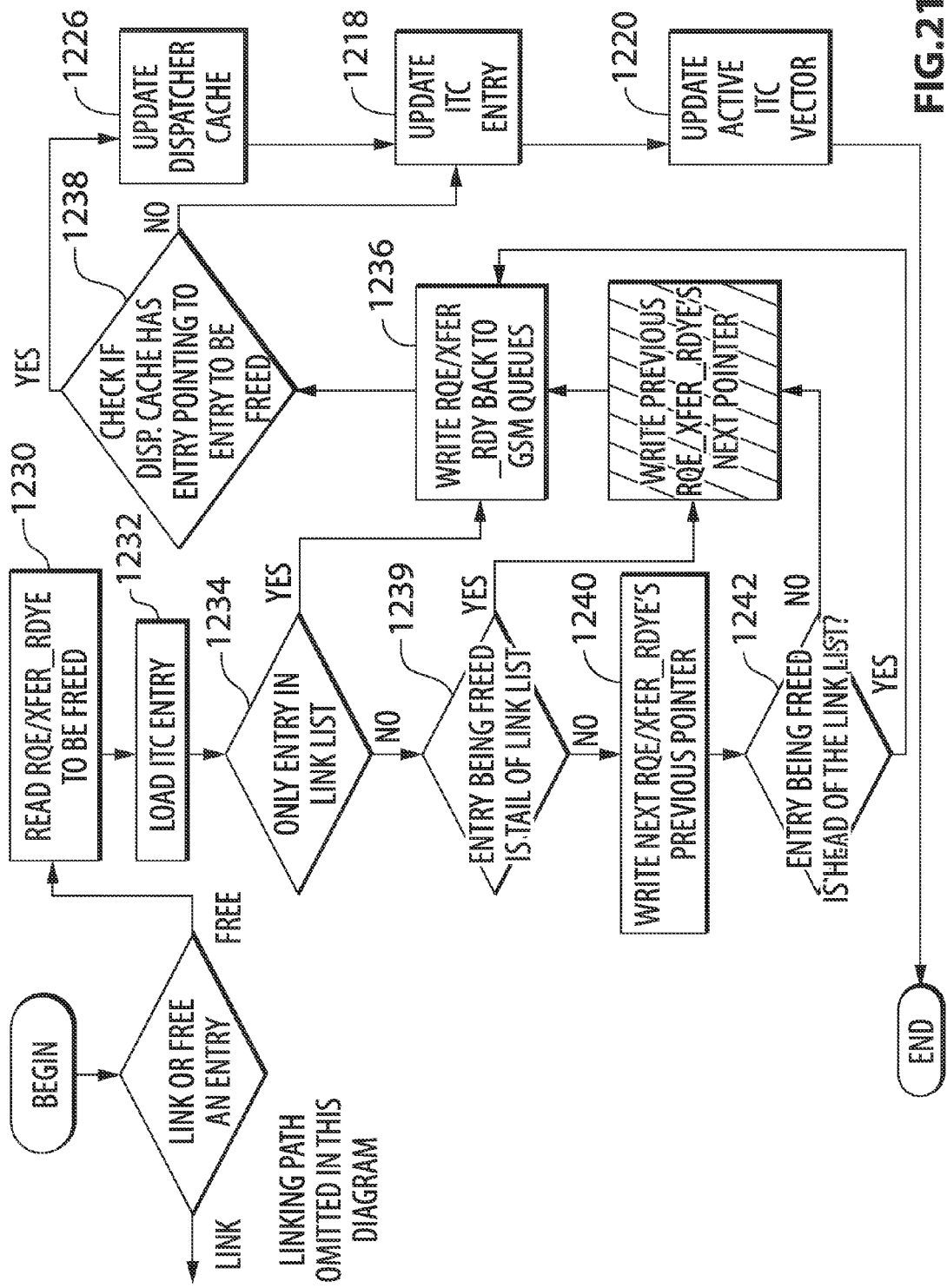
FIG. 21 is a flow chart diagram illustrating a portion of the process illustrated in FIG. 12 corresponding to removal of a RQE from the head of a link list.
Figure 22:
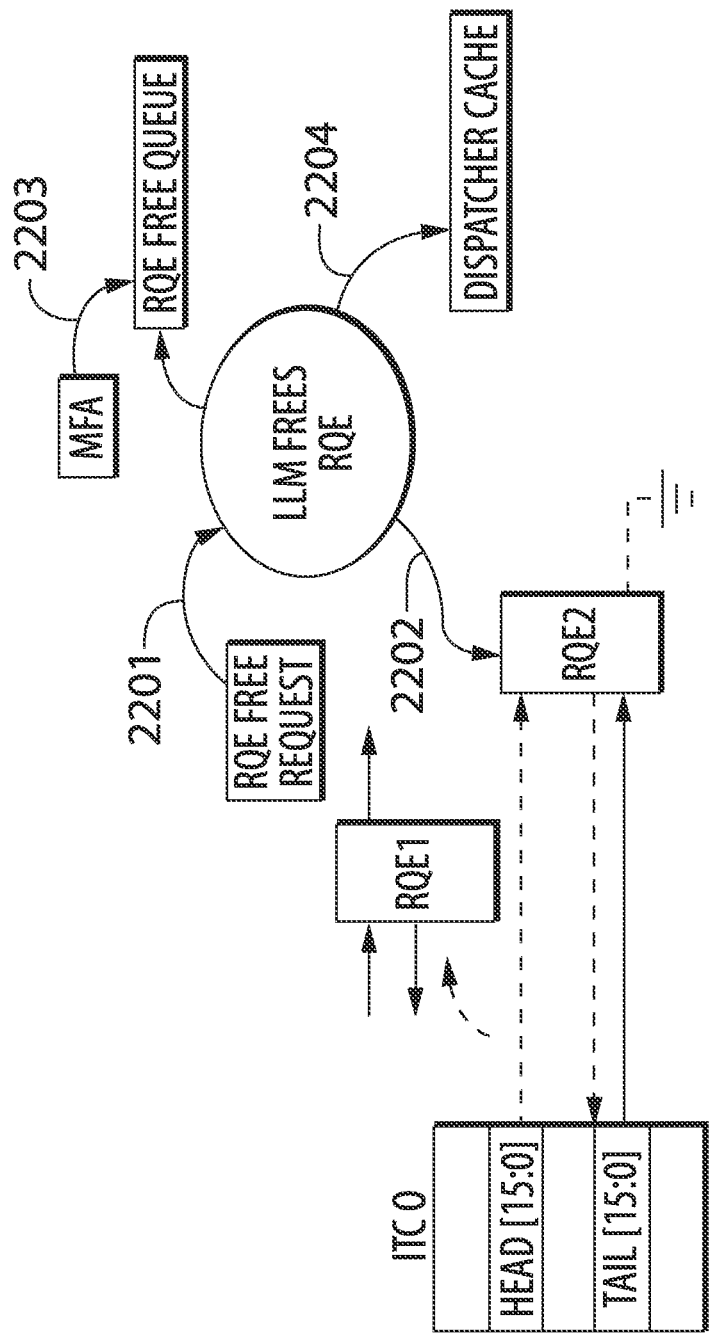
FIG. 22 is a flow diagram illustrating the steps involved in removing a RQE from the head of a Link List according to various embodiments.

FIG. 21 illustrates the process for removing RQE from the head of the link list. The numbers in parentheses refer to elements of FIG. 22.

When transport slice finished processing an RQE, it requests LLM to free the entry at 1204.

At 1230, The ITC number is passed along with the MFA from Transport slice to LLM.

At 1232, LLM loads the ITC entry's head and tail pointers.

At 1234, LLM determines that there is more than one entry in the link list.

At 1238, LLM determines that the entry being freed is not at the tail of the link list.

At 1240, LLM writes null pointer (0xFFFF) to RQE's next entry's previous pointer (2202).

At 1242, LLM identifies RQE to be freed is at the head of the link list.

At 1236, LLM writes the RQE entry to be freed to RQE queue so that the entry could be re-used (2203).

At 1238, LLM checks the dispatcher cache to see if the RQE has any cached entry points to it. If so, the dispatcher cache is updated at 1226 (2204).

At 1218, LLM updates the ITC by writing RQE's next pointer to ITC's head pointer (2202).

At 1220, LLM updates the ITCv.

Number of GSM Accesses

Through the above process, an RQE1 is removed from the link list. In various embodiments, the dispatcher cache is updated if there is any entry in the cache pointing to RQE1. In some embodiments, there are only four accesses (read or write) to external memories in GSM: (1) Read the ITC head and tail pointer; (2) Write null pointer to RQE2's previous pointer; (3) Write RQE1 MFA back to RQE Free Queue; and (4) Write RQE2 MFA to ITC head pointer.

Removing RQE/XFER_RDYE in the Middle of Link List

Figure 23:
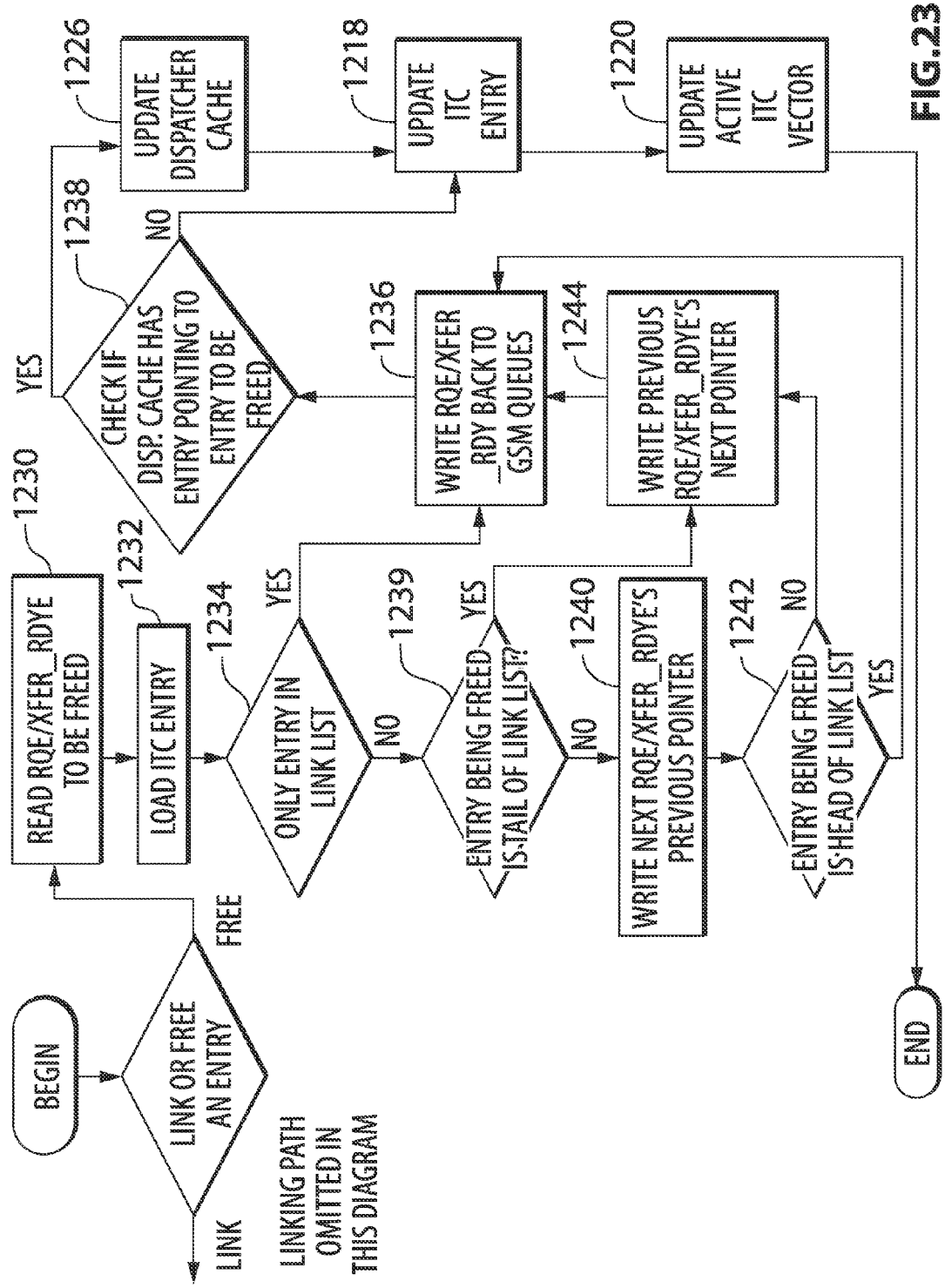
FIG. 23 is a flow chart diagram illustrating a portion of the process illustrated in FIG. 12 corresponding to removal of a RQE from the middle of a link list.
Figure 24:
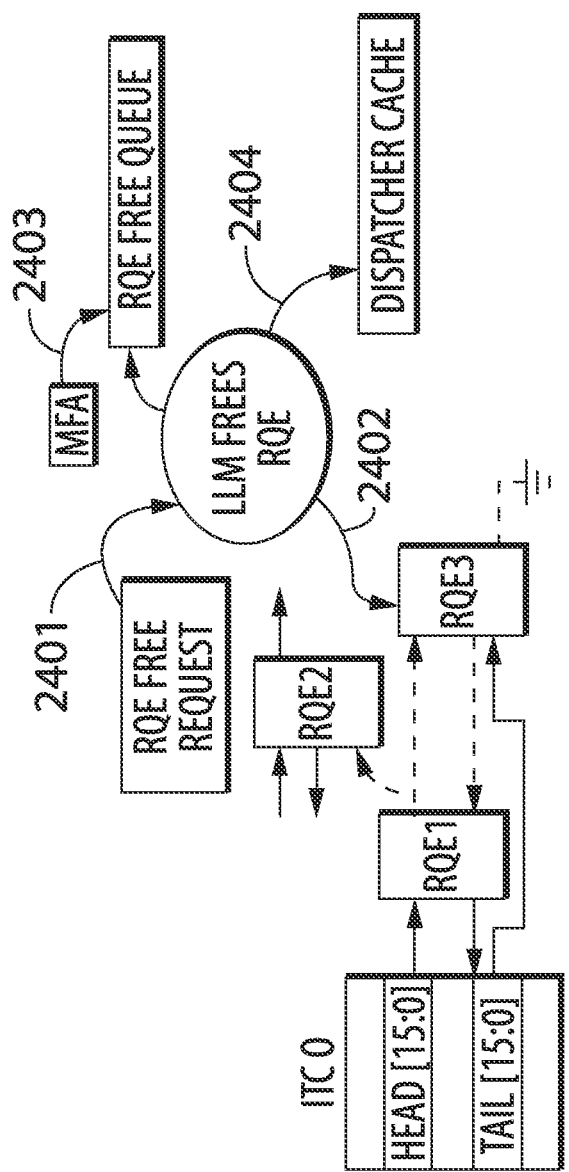
FIG. 24 is a flow diagram illustrating the steps involved in removing a RQE from the middle of a Link List according to various embodiments.

FIG. 23 is a flow chart diagram illustrating a process for removing a RQE from the interior of a link list. FIG. 24 is a schematic diagram of a process of removing a RQE from the interior of a link list.

When transport slice finished processing an RQE, it requests LLM to free the entry at 1204.

At 1230, The ITC number is passed along with the MFA from Transport slice to LLM.

At 1232, LLM loads the ITC entry's head and tail pointers.

At 1234, LLM determines that there is more than one entry in the link list.

At 1234, LLM determines that there is more than one entry in the link list.

At 1238, LLM identifies RQE to be freed, is in the middle of the link list and therefore determines that the entry being freed is not at the tail of the link list.

At 1240, LLM writes RQE's previous pointer to next entry's previous pointer (2402).

At 1242, LLM identifies RQE to be freed is not at the head of the link list.

At 1244, LLM writes RQE's next pointer to previous entry's next pointer (2402).

At 1236, LLM writes the RQE entry to be freed to RQE queue so that the entry could be re-used (2403).

At 1238, LLM checks the dispatcher cache to see if the RQE has any cached entry points to it. If so, the dispatcher cache is updated 1226 (2404).

At 1218, LLM updates the ITC.

At 1220, LLM updates the ITCv.

Number of GSM Accesses

Through the above described process, an RQE2 is removed from the link list. In various embodiments, the dispatcher cache is updated if there is any entry in the cache pointing to RQE2. In some embodiments, there are only four accesses (read or write) to external memories in GSM: (1) Read the ITC head and tail pointer; (2) Write RQE1 MFA to RQE3's previous pointer; (3) Write RQE3 MFA to RQE1's next pointer; and (4) Write RQE2 MFA back to RQE Free Queue.

SAS/SATA Back Off Handling

As discussed above, for some embodiments described herein, there are various scenarios in which a SAS/SATA transfer is backed off and put aside for a time and restarted later. In some embodiments, this can improve SAS link performance, a SAS/SATA transfer could be backed off and be put aside to restart later. In some embodiments, these scenarios include connection timeout, target busy, SATA atomic sequences. These scenarios are very common in SAS/SATA protocol. In such cases, in various embodiments, in order to make a PHY available, RQE or XFER_RDYE needs to be temporarily put aside (back off) after it has been dispatched to Transport slice.

In some embodiments, instead of finding the location and inserting back to the ITC link list, LLM implements logic that allows back off efficiently. In some embodiments, when dispatching an entry, LLD does not remove an entry from the link list. It writes the MFA along with other info into a cache entry.

Figure 25:
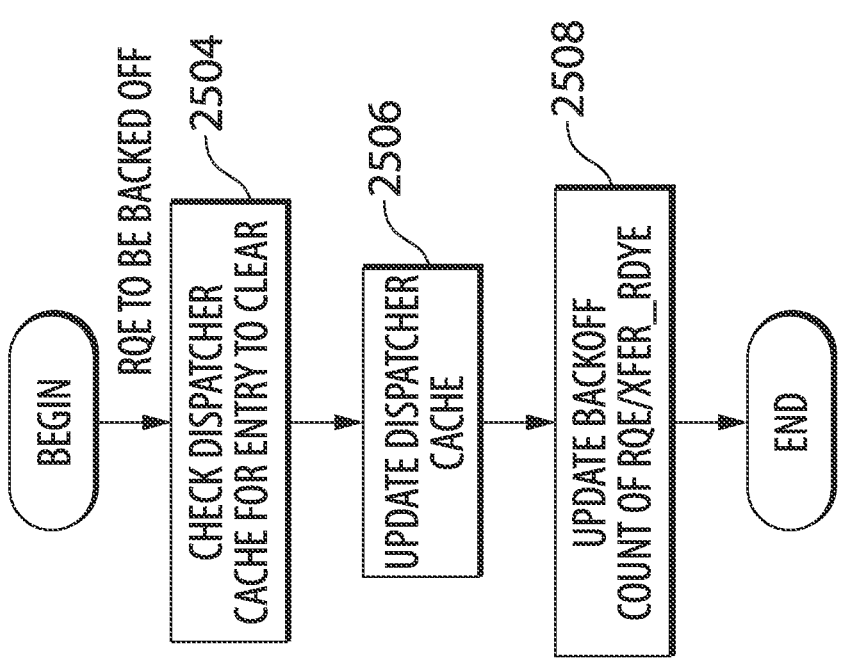
FIG. 25 is a flow chart diagram illustrating the process of backing off.

Reference is now made to FIG. 25. When transport slice sends a request to back off, LLM carries out the following actions:

At 2504, LLM checks whether the entry is in dispatcher cache.

LLM checks whether there are other entries pointing to the RQE/XFER_RDYE to be backed off.

At 2506, LLM clears the dispatcher cache for that entry and updates any other related entries related to the current one.

At 2508, LLM increments the back off count in the RQE/XFER_RDYE. In some embodiments, when the count exceeds a programmable threshold, the entry is dropped.

In various embodiments, LLD will try to dispatch the backed off entry again later on.

In various embodiments, the Dispatcher Cache is a block shared by LLM and LLD. The cache is described in greater detail below.

Link List Dispatcher

Figure 26:
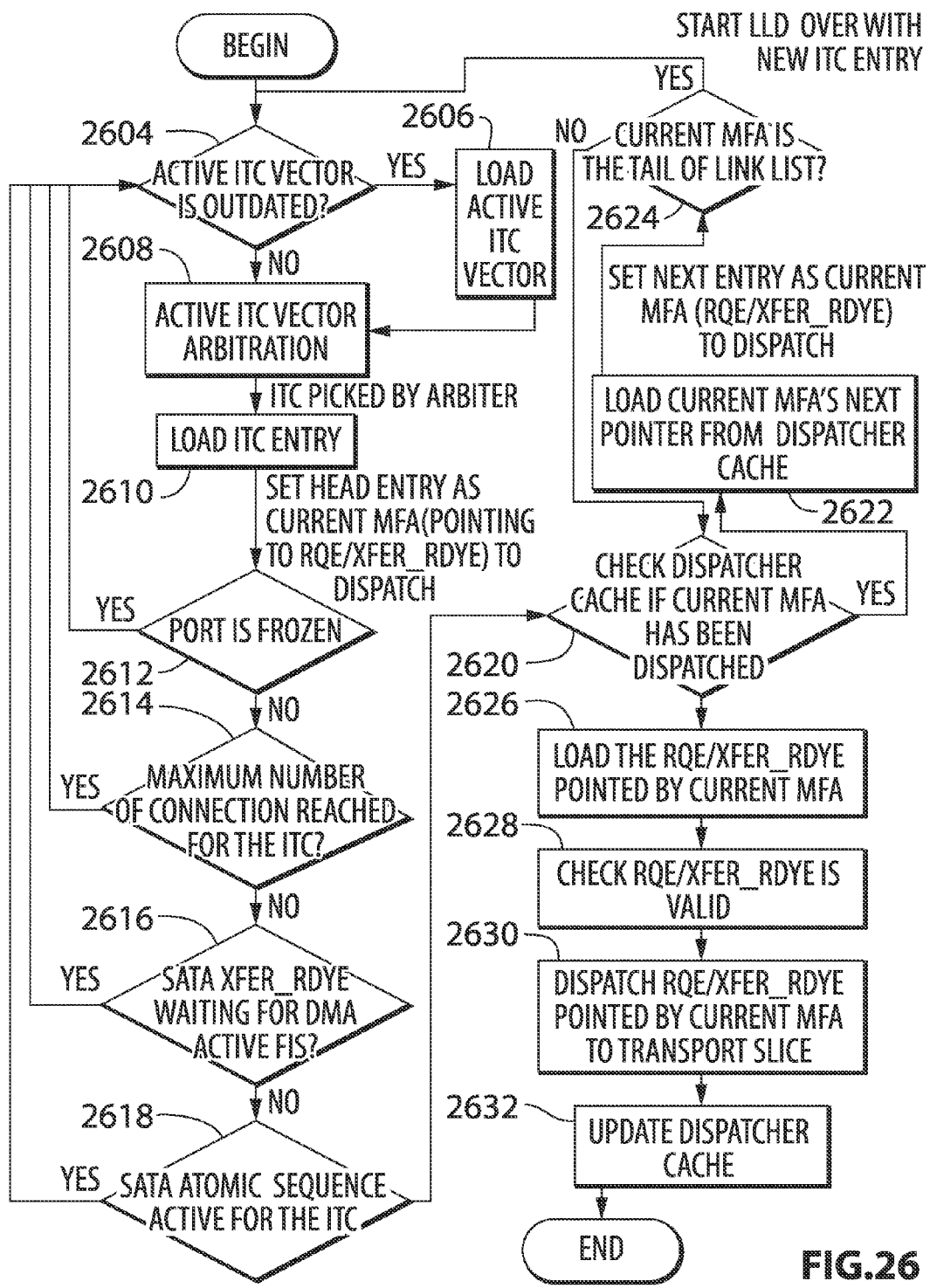
FIG. 26 is a flow chart diagram of a process executed by the Link List Dispatcher according to various embodiments.
Figure 27:
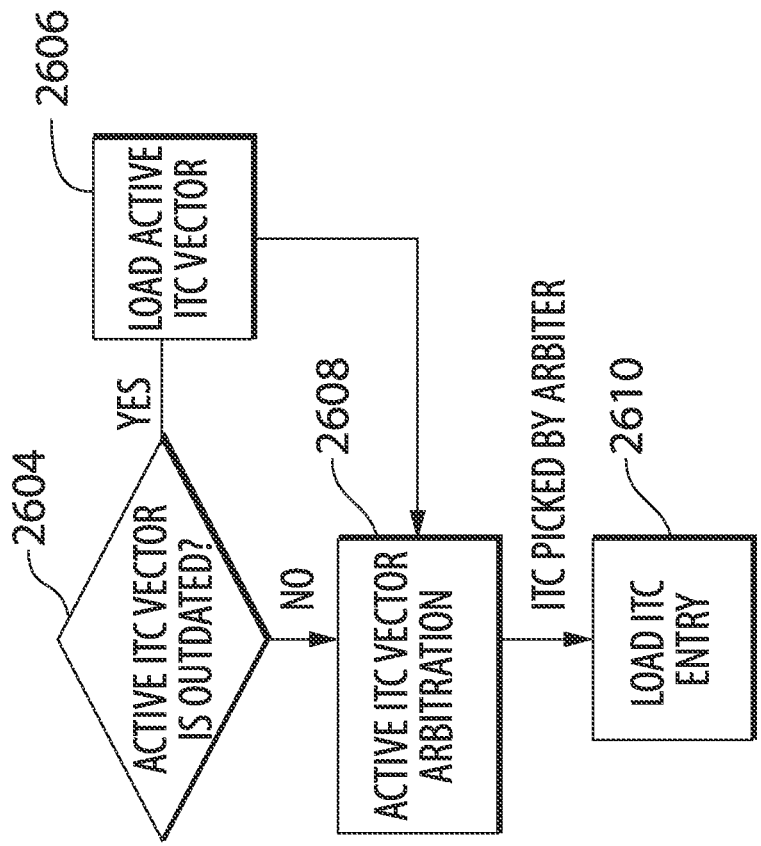
FIG. 27 is a flow chart diagram illustrating a portion of the process illustrated in FIG. 26 corresponding to arbitration and loading.

In some embodiments, the Link List Dispatcher (LLD)'s main function is to dispatch an RQE or XFER_RDYE to an appropriate PHY in the wide port. FIG. 26 is a flow chart diagram illustrating the process undertaken by LLD according to various embodiments.

In various embodiments, the LLD process can be broken into four phases: 1) Arbitrating and Loading ITC, 2) Checking ITC Availability, 3) Locating Entry, and 4) Updating Dispatcher Cache.

Arbitrating and Loading ITC

In various embodiments, the first part of LLD process involves active ITC arbitration, and ITC entry loading.

The Active ITC Vector (ITCv) is used by LLD to perform a fast lookup of which ITC has RQE/XFER_RDYE linked to it. The ITCv could be written by LLD when an entry is dispatched and it could also be written by LLM when an entry is linked or freed.

In LLD, the ITCv is cached in 128-bit segments in its local memory. For example, 2048-bit ITCv is divided up into 8×128 bits segments. At startup, LLD caches ITCv bit 0 to bit 127 in local memory. At 2604, LLD starts by checking whether the active ITC vector (ITCv) is outdated. If the ITCv has been updated by LLM, then LLD fetches the updated version of the ITCv at 2606. If the current 128-bit segment has pending entry, then LLD fetches the next 128-bit segment of ITCv.

Figure 28:
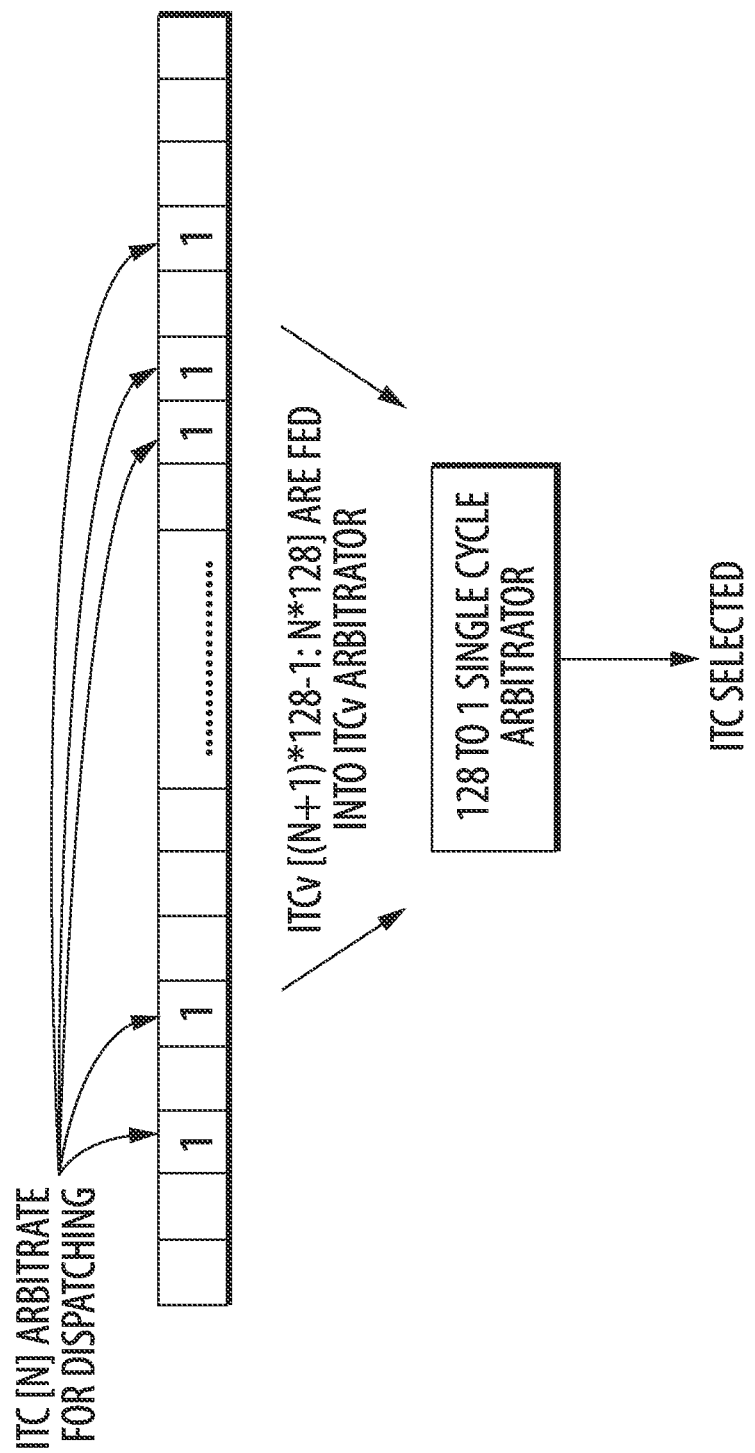
FIG. 28 is a schematic diagram illustrating the arbitration of FIG. 27.

At 2608, once the 128-bit updated ITCv segment is found, it is then fed into a single cycle arbiter to find the next ITC to be dispatched. FIG. 28 illustrates a schematic diagram of the arbitration. In some embodiments, the arbitrator uses a round-robin scheme to keep fairness among all the ITCs. In other embodiments, the arbiter is swapped out so that certain ITCs have higher priority than others.

At 2610, after the ITC number is identified, LLD translates the ITC number to the ITC address in GSM and loads the ITC entry. The Head/Tail pointers, along with various information of the ITC entry are loaded into LLD. The head pointer becomes the current MFA (RQE or XFER_RDYE) to dispatch. The MFA and the ITC information are passed down to the checking logic in LLD.

Checking ITC Availability

Figure 29:
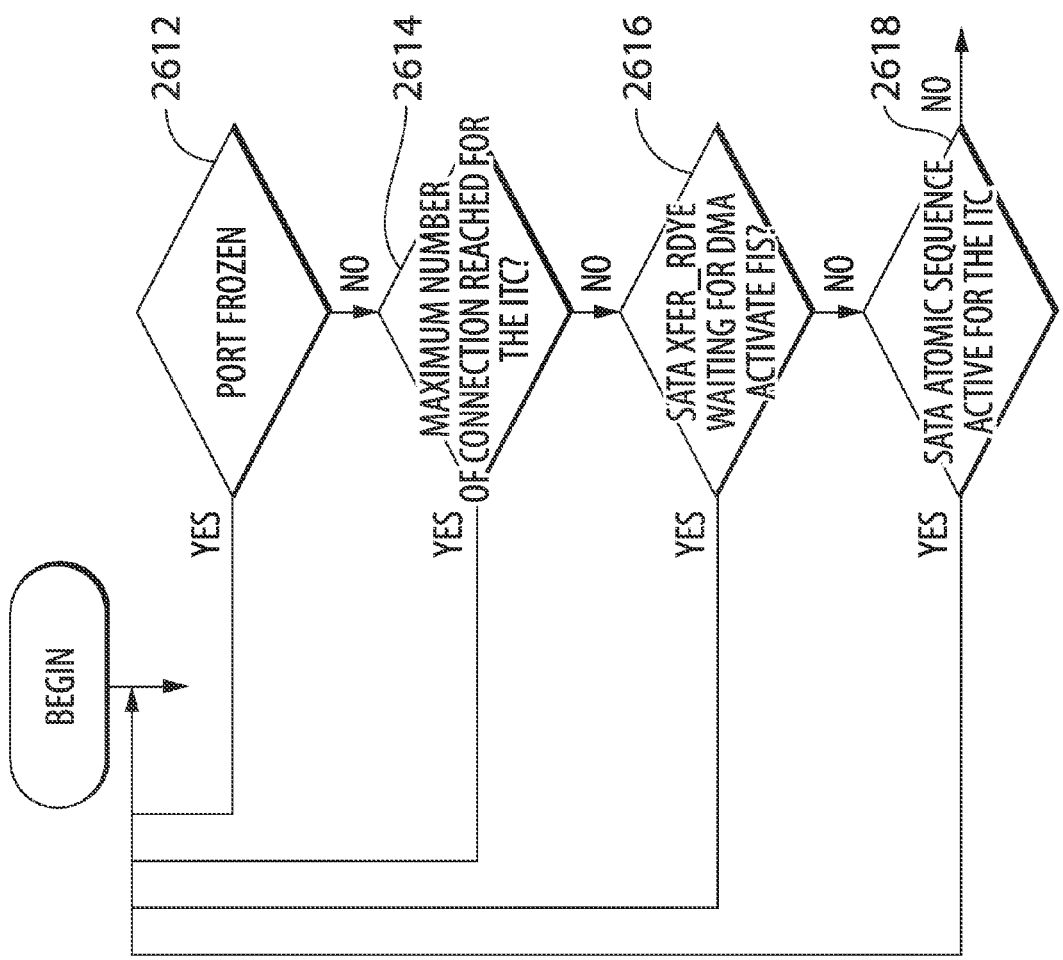
FIG. 29 is a flow chart diagram illustrating a portion of the process illustrated in FIG. 26 corresponding to ITC checking.

In various embodiments, the ITC identified by the arbitration logic will go through a few checks to ensure that an associated entry can be sent to the remote device. FIG. 29 illustrates a portion of the process of FIG. 26, which corresponds to checking ITC availability, according to some embodiments.

Port Freeze

According to the SAS specification, a port can have one or more PHYs in it. In various embodiments, a wide link is the set of PHYs that attach a wide port to another wide port. A SAS controller can have one or more wide or narrow ports connecting to various SAS domains.

In various embodiments, during error recovery a port could be frozen, for example, host handling of a fail over situation by moving IO commands from one port to another. In such embodiments, the controller has two ports to the same domain, that is it has two paths to the same group of drives. When one of the ports fails, the failing port is frozen and IO commands queued up for that port can be moved to another port to send them out. In some embodiments, port configurations can be modified without having to drop all pending IOs (RQE/XFER_RDYE in link list).

In some embodiments, when the firmware decides to freeze a port, it sets a register in LLD to indicate that the port is to be frozen. After LLD loads the ITC entry, it checks whether the associated port is frozen at 2612. If so, it would go back to the beginning and restart the arbitration process. In other words, all ITCs belonging to the frozen port are skipped by LLD. Firmware could then traverse the link list to operate on it.

Maximum Connection Number

As discussed above, a wide link has more than one PHY in it. In a topology involving wide links, the maximum number of connections that the controller could open to a device is equal to the width of the wide link.

Figure 30:
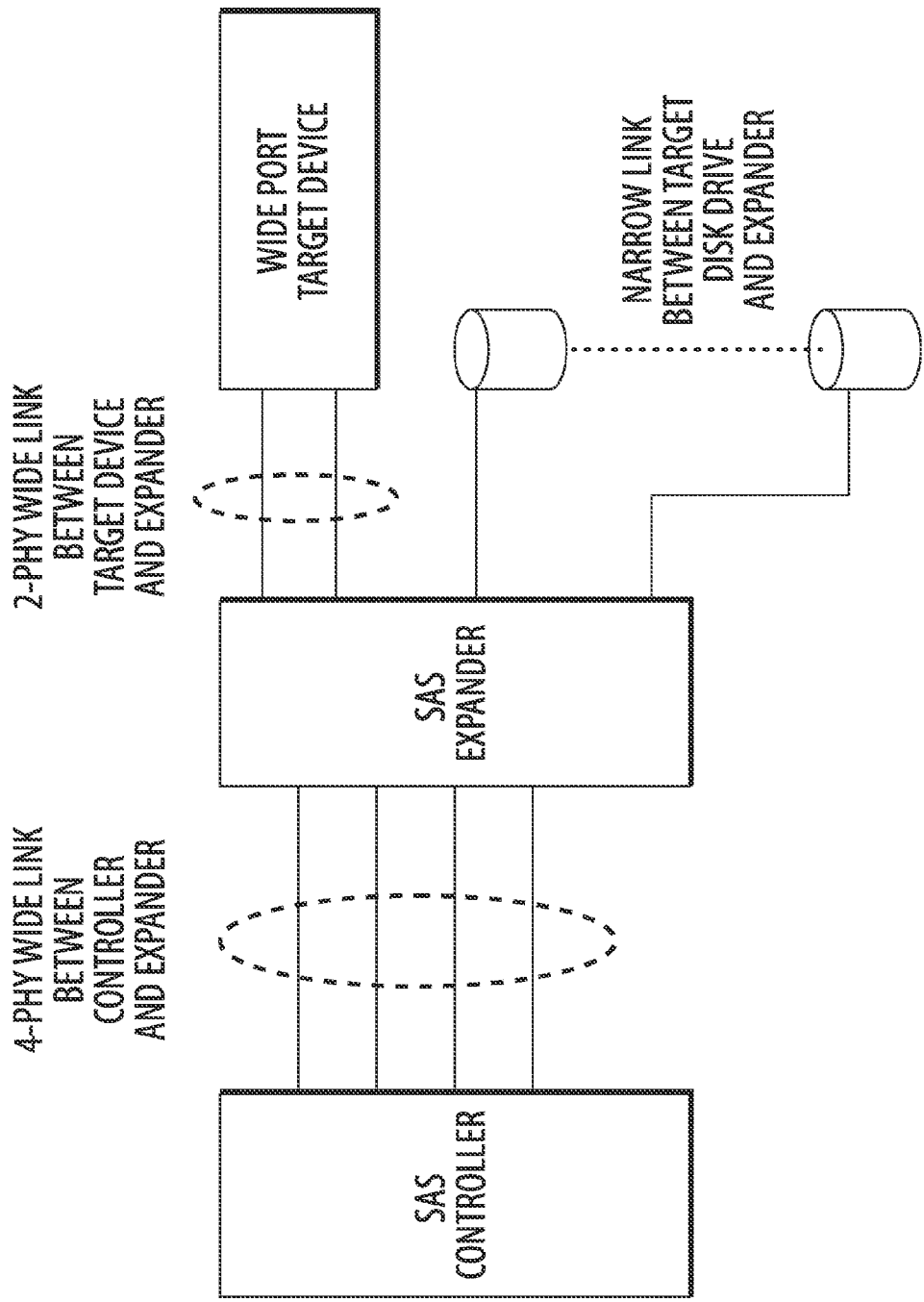
FIG. 30 is a schematic diagram of a SAS topology.

In FIG. 30, the SAS controller is connected with a 4-PHY wide link to the expander, while a 2-PHY wide link target device and various numbers of narrow link disk drives are connected to the expander. When the controller tries to send frames to the wide port target device, it sends connection OPEN on one of the links in the 4-PHY port in order to setup a connection. The expander relays the OPEN through one of the links in the 2-PHY wide port to the target device. In known systems, if the controller tries to open four connections to the 2-PHY wide target device, two of the links would be filled with Arbitration In Progress (AIP) from expander. These occupied links could not be used to connect to other devices and accordingly, this affects the overall performance of the system.

In various embodiments described herein, LLD performs checks to ensure that the correct number of connections is opened to a target. A Maximum Number of Connections field is initialized in every ITC entry during discovery process. When LLD loads the ITC, this number is read from GSM along with other fields, such as head and tail pointers. At 2614, LLD then uses the maximum connection number to compare to the total number of connections currently on the SAS PHYs which are opened to that particular ITC. In various embodiments, if the connection has reached the maximum, LLD restarts the dispatching process with another ITC. In various embodiments, this strategy allows the LLD to ensure that the links are fully utilized when there are requests to various devices.

SATA Atomic Sequence Back Off

Figure 31:
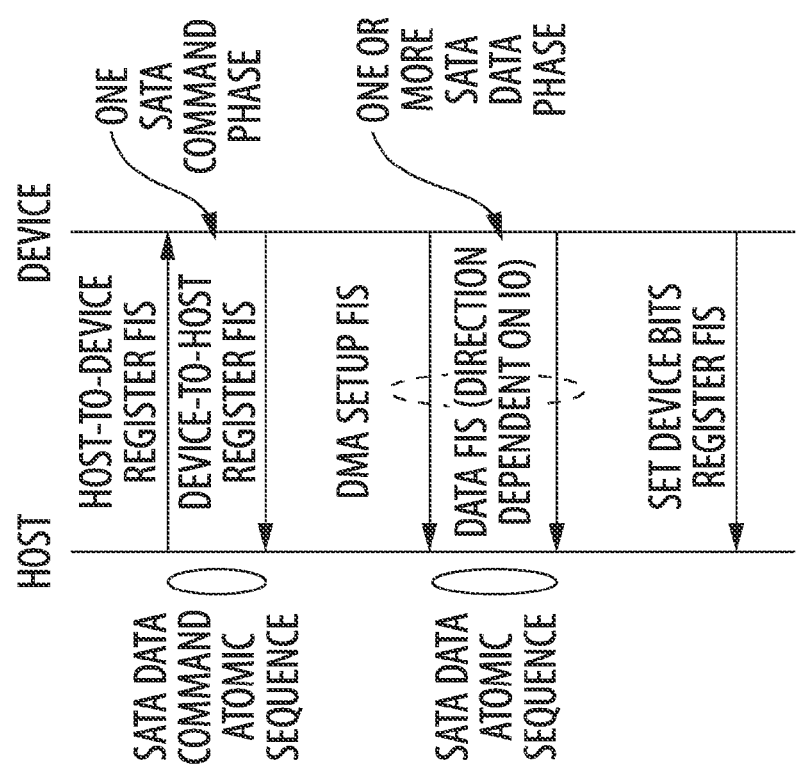
FIG. 31 is a flow diagram of a SATA atomic sequence.

With SATA queuing command protocol (NCQ), multiple commands can be pending on a drive. For example, a NCQ supported drive could be receiving new commands while preparing data to send back to the host for improved performance. SATA atomic sequence is established between host and device with SATA NCQ. FIG. 31 illustrates a simple view of a SATA NCQ command.

There are two types of atomic sequences: (1) the SATA Command Atomic Sequence during the command phase of an IO and (2) the SATA Data Atomic Sequence during the data phase of an IO. For a single IO command, there can be one or more data phases. In some embodiments, in order to facilitated the NCQ, a host controller guarantees that during any atomic sequence for an IO command, only FISes for that IO command are exchanged. For example, in some embodiments, during a command phase atomic sequence, after the host sends the Host-to-Device Register FIS (H2D), it does not send any new H2D to the device until the corresponding Device-to-Host Register FIS (D2H) is received. Similarly, in some embodiments, after a controller receives a DMA Setup FIS for an IO, the drive indicates the start of an atomic sequence and the controller does not send any new H2D command FIS to the drive until the data phase is finished.

In various embodiments, LLD handles SATA atomic sequences by checking the fields in ITC entry for the SATA drive. After loading the ITC entry, at 2618 LLD checks whether the drive is in an atomic sequence for command phase or data phase. If so, it restarts the dispatching process with another ITC. With this strategy, LLD ensures that there is no new command in any of its' SAS links waiting for an atomic sequence to finish.

SATA XFER_RDYE Pending on DMA Activate FIS

As discussed above, a data phase atomic sequence is established between a host and a device. In a SATA NCQ write command, every data FIS from host to device is sent by the controller when a DMA Activate FIS is received. If the drive is busy or cannot receive anymore data FIS for a short period of time, it would hold up the DMA activate FIS until it is ready. Accordingly, in various embodiments, in such case, the STP connection is closed and the SAS link is relinquished for other drives to use.

Figure 32:
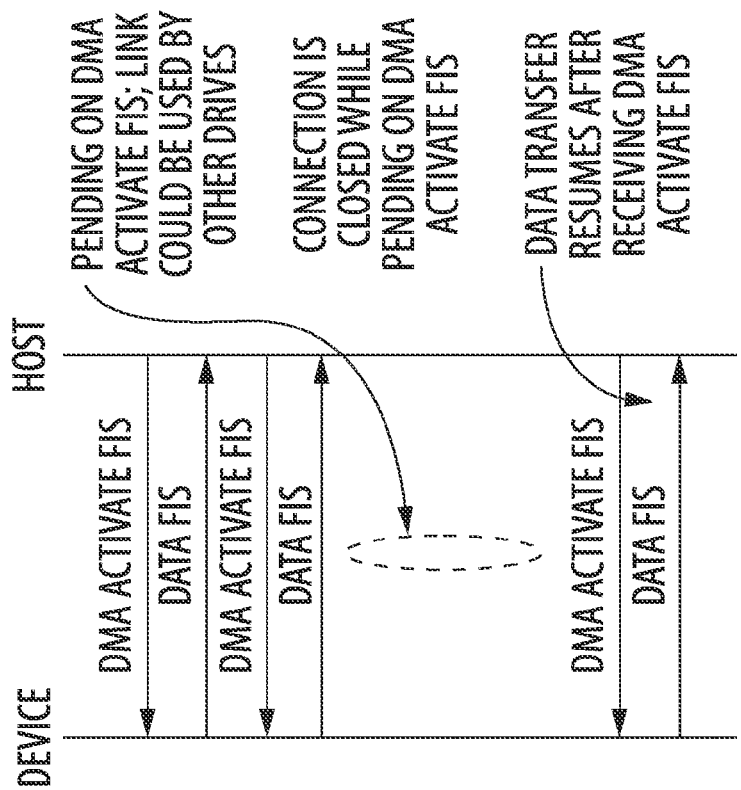
FIG. 32 is a flow diagram of a SATA data write sequence.

At 2616, LLD checks whether SATA XFER_RDYE at the front of the link list is pending on DMA Activate FIS. If it is, it would restart the dispatching process with another ITC. This is to ensure that the pending XFER_RDYE would not be occupying a SAS link. The SAS link could then be used by another device. FIG. 32 illustrates a schematic diagram of SATA Data Write Sequence in which a link is pending on DMA Activate FIS and is made available for other devices.

Locating an Entry

Figure 33:
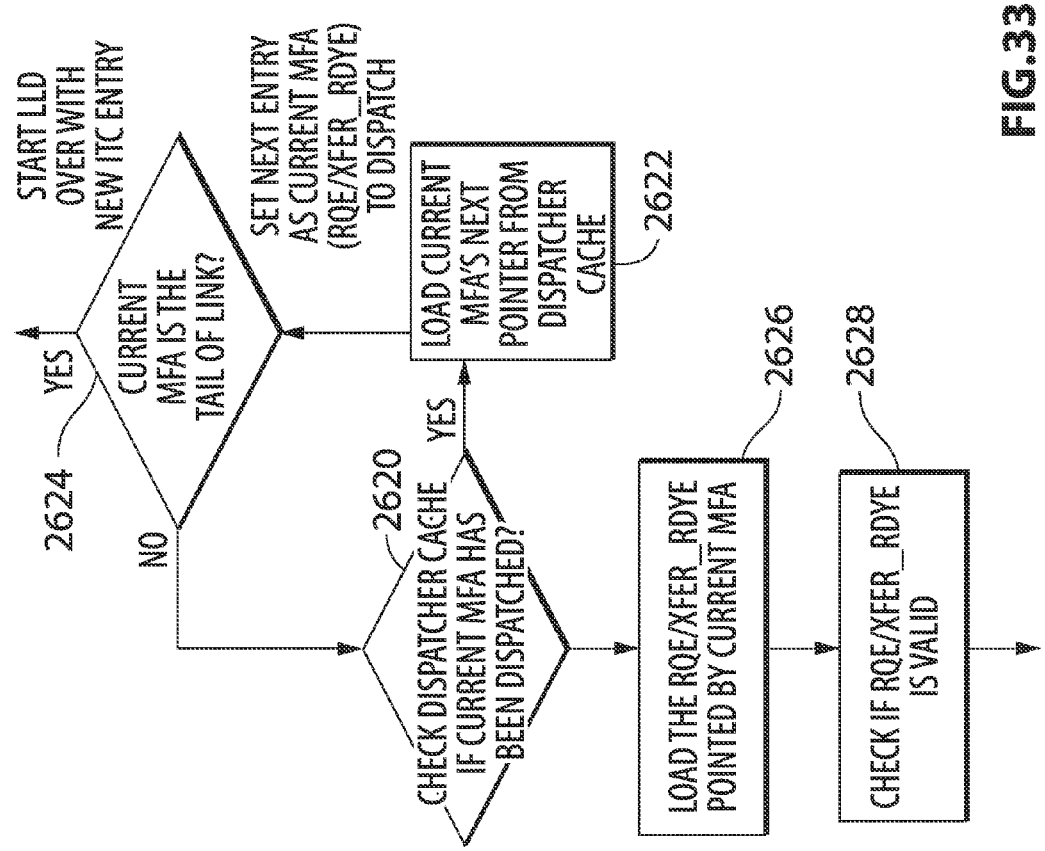
FIG. 33 is a flow chart diagram illustrating a portion of the process illustrated in FIG. 26 corresponding to locating an entry.

After an ITC entry is identified, LLD starts to locate an RQE or XFER_RDYE to dispatch. FIG. 33 illustrates a portion of FIG. 26, which is associated with locating an entry, according to various embodiments.

The current MFA is first set when an ITC is loaded. The head pointer in the ITC becomes the current MFA (of RQE or XFER_RDYE).

LLD checks if the current MFA has been dispatched at 2620. If the MFA has been dispatched, the MFA is stored in the dispatcher cache. LLD starts to traverse down the link list.

If the current MFA has been dispatched, LLD loads the next pointer from the dispatcher cache to become the current MFA at 2622. Having the MFA and its next pointer stored in the dispatcher cache significantly reduces the amount of time to traverse the link list.

At 2624 LLD determines whether the current MFA is the tail of the link list.

When the current MFA is found to not have been dispatched, LLD loads the RQE/XFER_RDYE to get ready for dispatching to transport slice at 2626.

When the RQE/XFER_RDYE is loaded, LLD checks whether the entry is valid at 2628. If RQE/XFER_RDYE is invalid, it marks the entry with special error code.

When the entry is located, LLD gets it ready for dispatching to a transport slice.

Updating Dispatcher Cache

Figure 34:
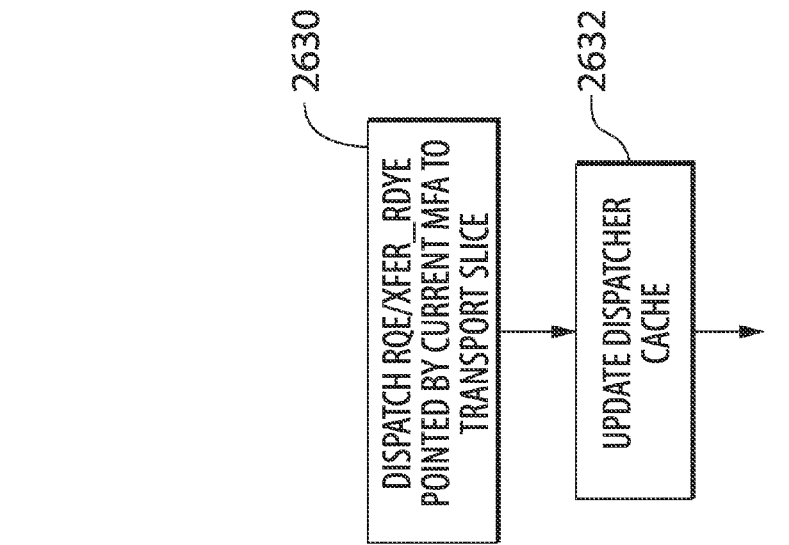
FIG. 34 is a flow chart diagram illustrating a portion of the process illustrated in FIG. 26 corresponding to updating the dispatcher cache.

FIG. 34 illustrates a portion of the process of FIG. 26, which corresponds to updating the dispatcher cache according to various embodiments.

When the RQE/XFER_RDYE is found, the entry is sent to transport slice for transport-link-PHY processing at 2630. After the entry is dispatched, LLD updates the dispatcher cache at 2632.

Number of GSM Accesses by LLD

Through the above dispatching process, the number of GSM accesses is limited. (1) Read ITC entry for head/tail pointers as well as other information, such as maximum connection number, SATA status etc. (2) Read RQE/XFER_RDYE for dispatching. This is for reading the entry pointed by MFA.

In some embodiments, there are a total of two read accesses to GSM. In various embodiments, whenever an entry is dispatched, it is cached in the dispatcher cache. As such, the dispatcher cache significantly reduces the need to traverse the link list through external GSM memory.

Dispatcher Cache

Figure 35:
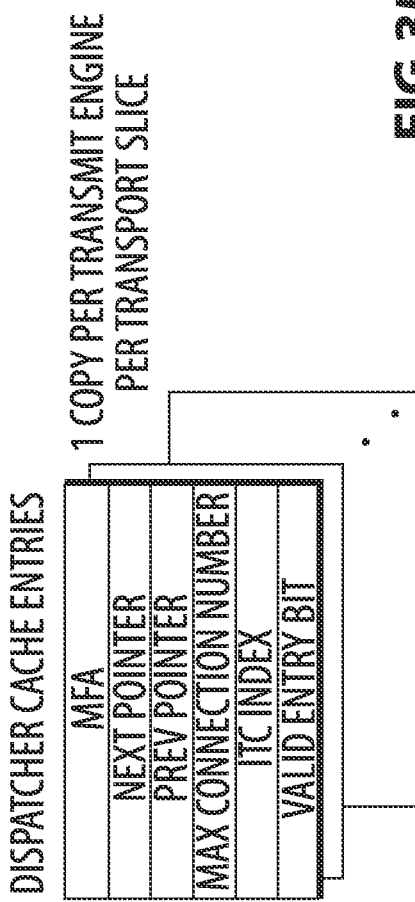
FIG. 35 is a schematic diagram of a dispatcher cache entry format according to various embodiments.

Reference is now made to FIG. 35, which is a schematic diagram of dispatcher cache entries, according to various embodiments. As discussed above, in some embodiments, the Dispatcher Cache is the block that stores the information of all the dispatched entries. In various embodiments, for each of the entries dispatched to transport slices, the Dispatcher Cache stores at least some of the following information:

One Dispatcher Cache entry is assigned to each transmit engine in a transport slice. In other words, in some embodiments there is one copy per transmit Engine per transport slice.

MFA containing address to RQE/XFER_RDYE that has been dispatched

Next Pointer (RQE/XFER_RDYE) pointing to the next entry in the link list

Figure 36:
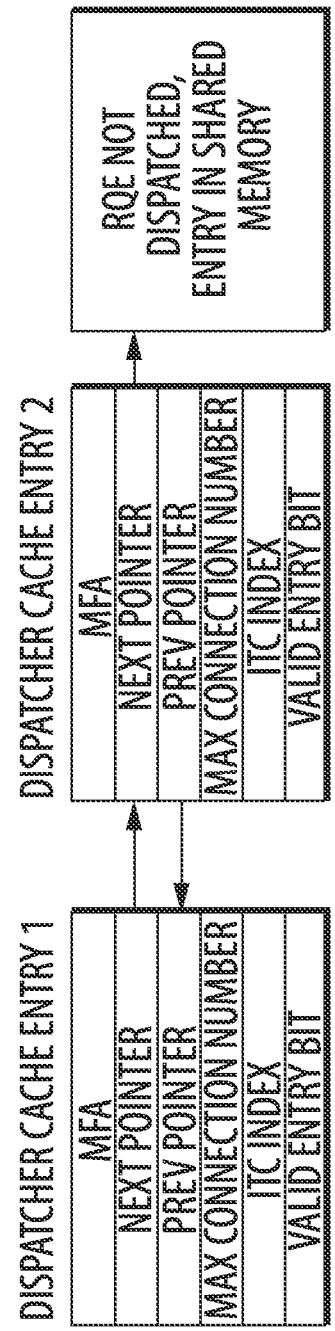
FIG. 36 is a schematic diagram of a dispatcher cache link list according to various embodiments.

Previous Pointer (RQE/XFER_RDYE) pointing to the previous entry in the link list Maximum Connection Number for the entry ITC index for the dispatched entry In various embodiments, the Dispatcher Cache block serves the following requests from the LLM and LLD:

Given a MFA and if the MFA is found in the Dispatcher Cache, it returns the respective ITC, next pointer and type, previous pointer and type Given a MFA and if the MFA is found in the Dispatcher Cache, it removes the MFA and all the associated information Given a MFA and if the MFA is found in the Dispatcher Cache, it updates the next pointer and type to new values provided by LLM/LLD Given a MFA and if the MFA is found in the Dispatcher Cache, it updates the previous pointer and type to new values provided by LLM/LLD Add a new MFA and all of the associated information when LLD dispatches an entry Given a ITC number, it returns the total number of entries that has been dispatched to the transport slice In short, in various embodiments, the dispatcher cache block keeps a cached copy of entries that have been dispatched. The next and previous pointers are cached along with other information. These fields are updated as LLM and LLD progress through their operations. If there are multiple entries that have been dispatched in an ITC link list, the dispatcher cache forms a cached link list, see FIG. 36.

As discussed in earlier sections, in various embodiments, the dispatcher cache provides a performance enhancement by reducing link list operations and hence the accesses to external memory in GSM. The following sections provide more detail on some of the operations that dispatcher cache is involved in.

LLM Linking and Removing Entries

In various embodiments, When LLM inserts a new RQE/XFER_RDYE at the end of the ITC link list, one of the steps it does is to update the tail entry's next pointer. In the case that the tail has been dispatched, LLD sends a request to the dispatcher cache block to update the tail entry's next pointer to the new entry.

Figure 37:
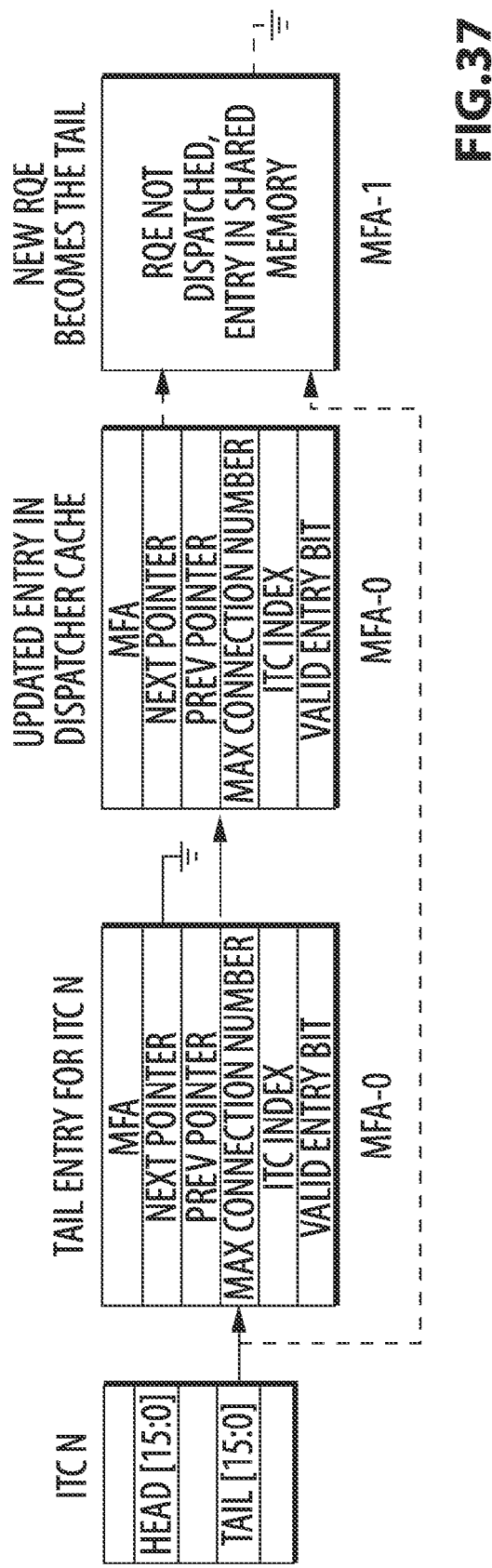
FIG. 37 is a schematic diagram illustrating an update in the dispatcher cache according to various embodiments.

FIG. 37 is a schematic diagram that illustrates n update of a tail entry in the dispatcher cache for ITC N. LLM fetches a new RQE, MFA-1, and tries to insert to the tail of ITC N. When LLM fetches the tail pointer, MFA-0, of the link list, it finds that the tail pointer has already been dispatched to one of the transport slices. As such, the dispatcher cache has a copy of MFA-0. Instead of holding up the MFA-1 insertion to wait for MFA-0 to finish, LLM updates the tail pointer in the cache. The next pointer of MFA-0 is updated to point to MFA-1. In some embodiments, one of the main functions of the dispatcher cache is to keep the dispatched entries up-to-date. In other words, the cache is coherent with the actual link list, even when pointers are updated for the dispatched entries. When LLM frees or clears MFA-0, all of MFA-0 next and previous pointers are updated from dispatcher cache. LLM does not need to traverse the link list to find the entries linked to MFA-0. During removal of MFA-0, dispatcher cache provides the pointers and accordingly, LLM removes the entry with that information.

In some embodiments, the dispatcher cache provides significant savings compared to fetching the actual link list from external GSM memories. This is especially important when SAS back off happens; RQE/XFER_RDYE is removed from the transport slice and goes back to the link list during back off.

LLD Traversing Link List

Figure 38:
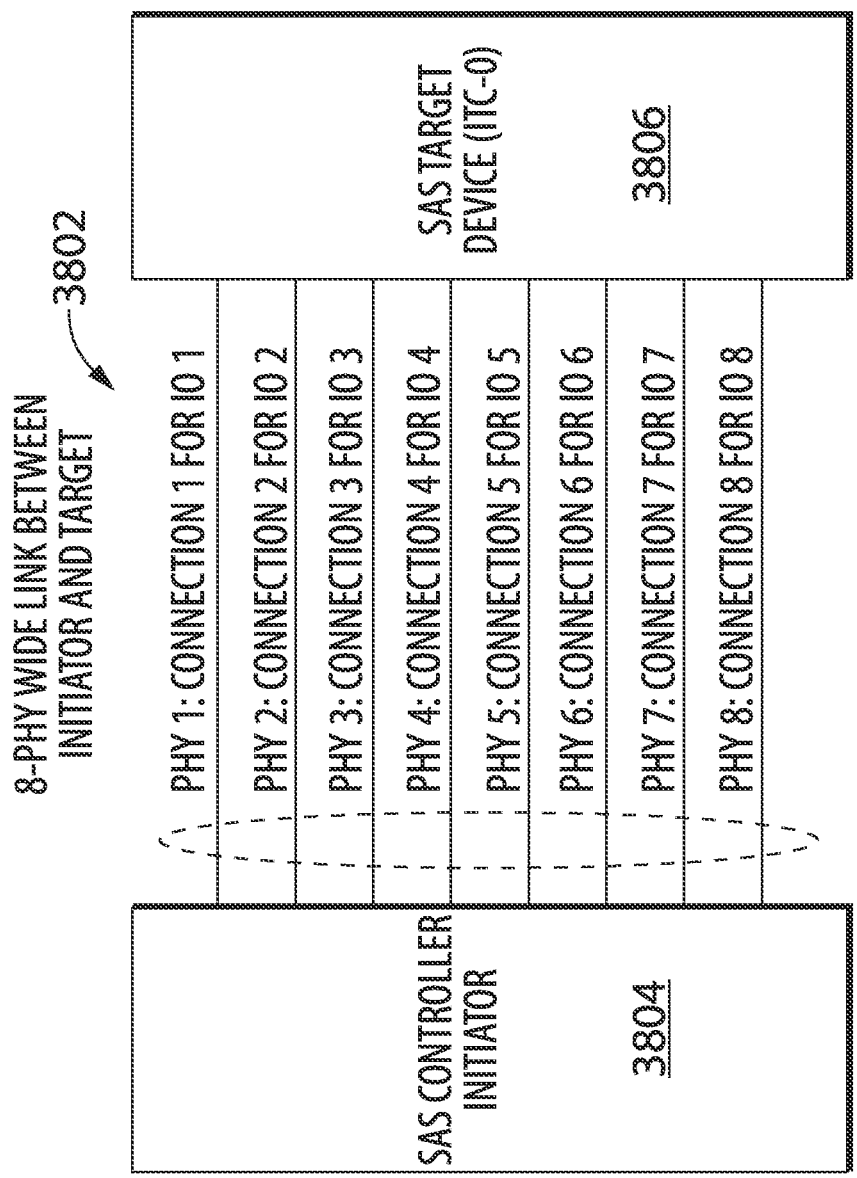
FIG. 38 is a schematic diagram illustrating an example of a wide port topology according to various embodiments.

In SAS protocol, multiple connections can be opened to a single wide link target. In such cases, multiple transfers for multiple IOs could be carried on the wide port links. FIG. 38 is a schematic diagram illustrating an example of such a topology. Specifically, FIG. 38 illustrates an 8-PHY wide link 3802 between an initiator (SAS Controller Initiator 3804) and a target (SAS Target Device (ITC-0) 3806).

Figure 39:
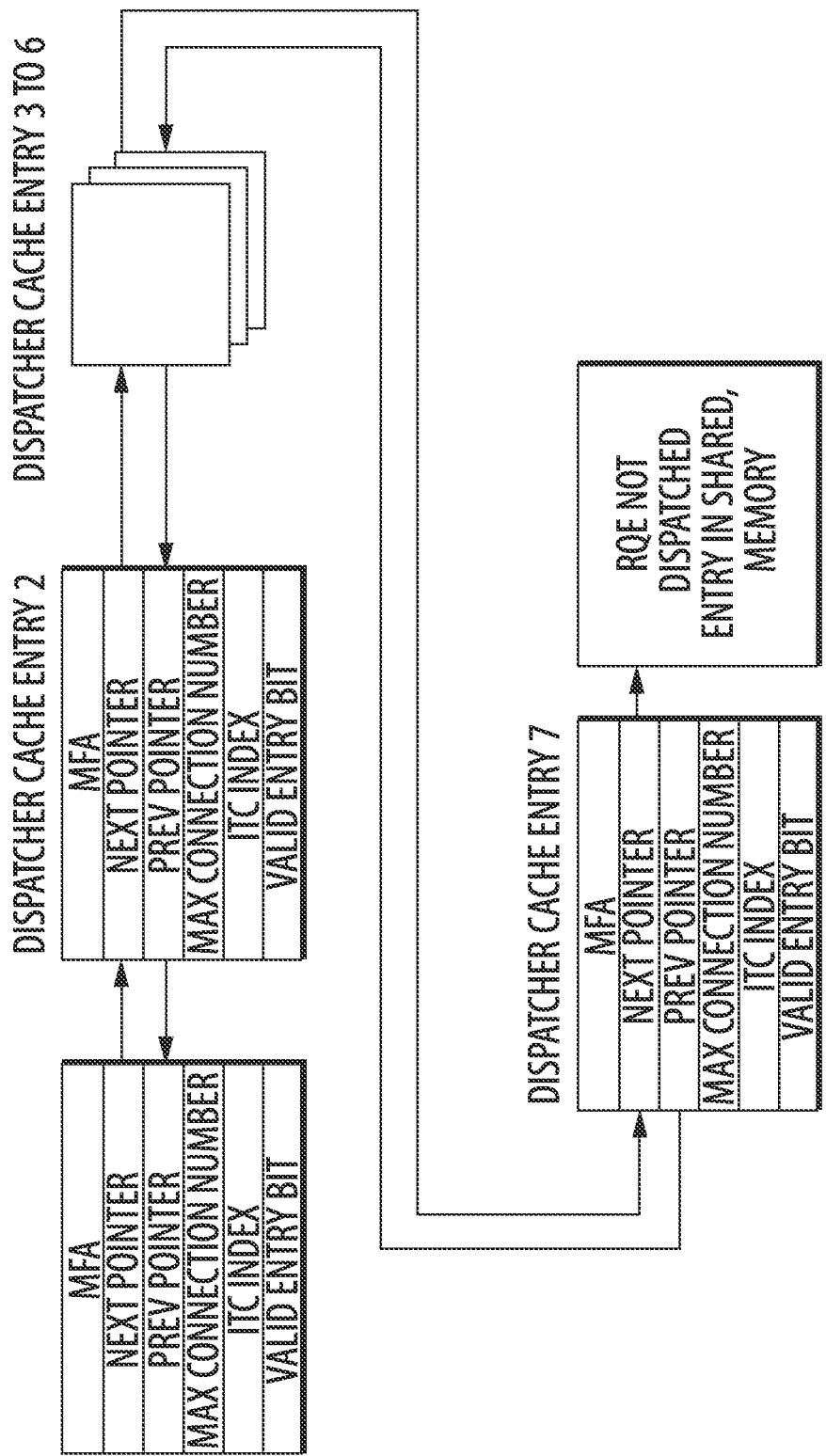
FIG. 39 is a schematic diagram illustrating dispatcher cache traversal according to various embodiments.

Initially, seven IO (IO 1 to IO 7) have been linked to the ITC-0 link list (either RQE or XFER_RDYE). When the first entry is dispatched to PHY 1, the MFA, maximum connection number etc, are cached in a dispatcher cache entry. Later on, IO 2 to IO 7 are dispatched. Dispatcher cache is updated while these entries are sent to PHY 2 to 7. At this point, the dispatcher cache would have cached the ITC-0 as shown in FIG. 39, which is a schematic diagram of Dispatcher cache traversal.

Figure 40:
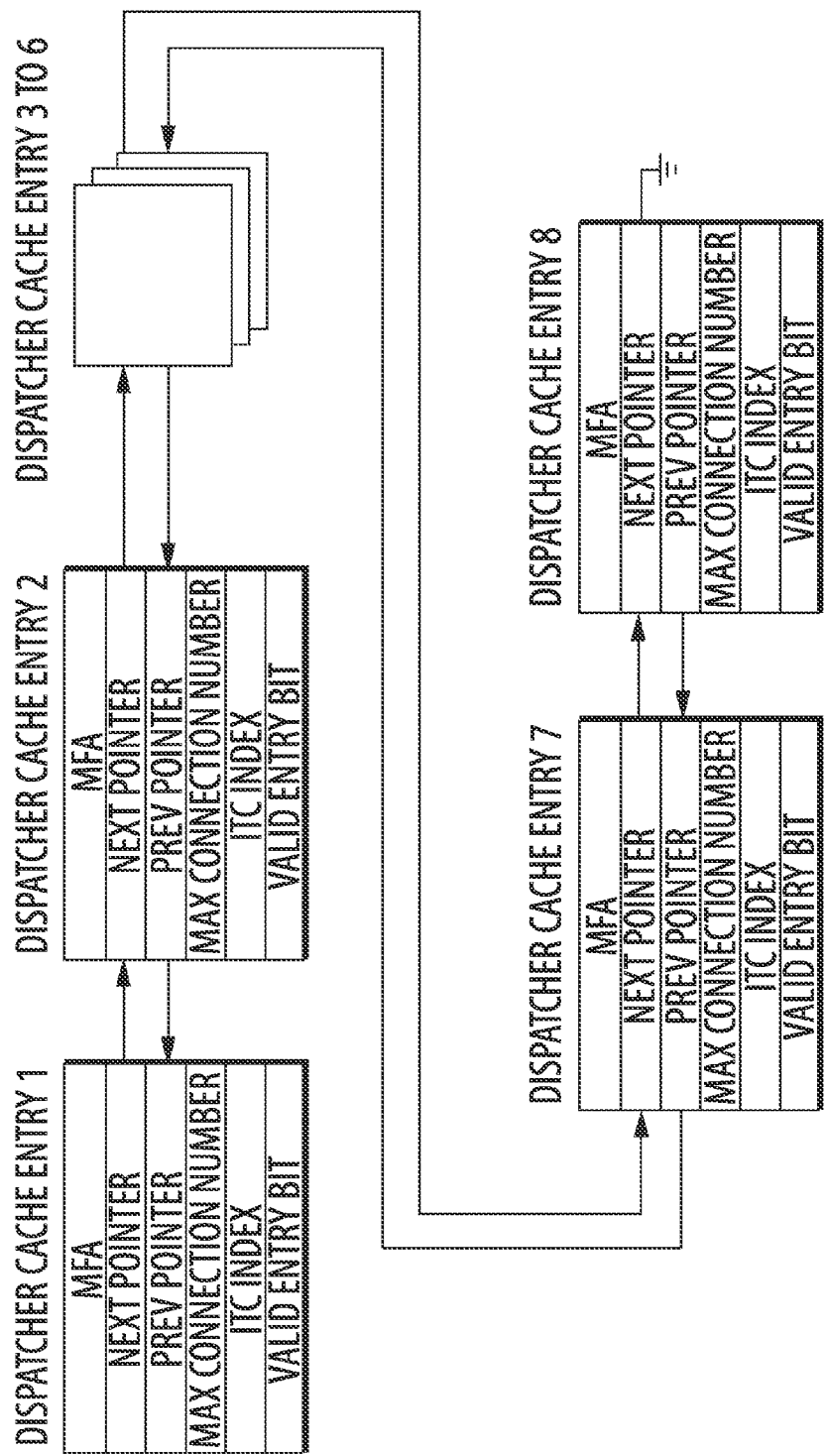
FIG. 40 is a schematic diagram illustrating dispatcher cache for eight entries belonging to the same ITC according to various embodiments.

When LLD tries to dispatch IO 8, it loads up the ITC. It then finds that IO 0 has been dispatched. Following the next pointer in each cached entry in the dispatcher cache, LLD traverses through IO 2, 3, 4 to 7 and locates IO-8, which hasn't been dispatched. IO-8 is then dispatched and dispatcher cache is updated accordingly. FIG. 40 illustrates Dispatcher Cache for Eight Entry belonging to the same ITC.

In some embodiments, the traversal via the dispatcher cache provides considerable amount of savings on memory accesses. Since in various embodiments the cache is local to LLD, access time is 1 cycle per entry. In this case, traversing 7 entries would require only 7 cycles. On the other hand, if there is no dispatcher cache, using a GSM memory, it would cost 7×16 cycles=112 cycles. The savings are multiplied when back off of entries happen.

Accepting/Rejecting Connection

One of dispatcher cache's features is to provide the number of dispatched entries for a particular ITC. When incoming connection OPEN is received, LLD takes an ITC number and makes an inquiry to the dispatcher cache to check how many entries for that ITC have been dispatched and the maximum number of connections for that ITC. With the information, LLD decides whether to accept or reject a connection OPEN request. When the max connection number is not reached, the OPEN request is accepted. Otherwise, the connection would be rejected.

Some embodiments described herein are applicable to RAID controllers such as for example, RAID on Chip (ROC) controllers. Some embodiments described herein are applicable to SAS/SATA protocol controllers. Some embodiments described herein are applicable to SAS-to-Flash managers.

Some embodiments described herein relate to SAS RAID controller architecture within a server and also to external storage RAID controllers. Considering the high attach rate of SAS and RAID server/external storage market, this invention could directly affect how the controller is built.

Various embodiments have been described in this document. Although the embodiments have been described with specific reference to SAS/SATA protocol, the description is intended to be illustrative of the invention and is not intended to be limiting. Accordingly, the description is suitable for other protocols as well. Alterations, modifications and variations can be effected to the particular embodiments by those of skill in the art without departing from the scope.

What is claimed is:

1. A controller for controlling a device, the controller comprising:
   a memory for storing
   instructions, including a first instruction and a second instruction, the first instruction comprising a pointer to the location of the second instruction in the memory, for organizing the first and second instructions into a link list;
   a link list dispatcher configured to dispatch, to the device, the first instruction and the second instruction stored in the memory, and to create a first reference entry to the first dispatched instruction and a second reference entry to the second dispatched instruction, the first reference entry comprising a pointer to the location of the first instruction stored in the memory, and comprising the pointer to the location of the second instruction stored in the memory;

a dispatcher cache for storing the first reference entry to the first dispatched instruction and the second reference entry to the second dispatched instruction; and a link list manager block for managing the link list of instructions stored in the memory, and configured to:
  receive a back off request for the second dispatched instruction, and
  clear the second reference entry from the dispatcher cache so that the link list dispatcher will dispatch, to the device, the second instruction from the memory based on the pointer to the location of the second instruction stored in the memory, in the first reference entry.

2. The controller of claim 1, wherein the controller is a SAS/SATA controller.

3. The controller of claim 1, wherein the controller comprises a transport layer, the transport layer comprising a global block and a plurality of slices.

4. The controller of claim 3, wherein the global block comprises the link list manager, the dispatcher cache, and the link list dispatcher.

5. The controller of claim 4, wherein the dispatcher dispatches the instructions to at least one of the plurality of slices.

6. The controller of claim 5, wherein the instructions comprise a connection request for a remote device.

7. The controller of claim 6, wherein the dispatcher backs off the connection request if the device is unavailable.

8. A method of dispatching instructions to a device, the method comprising:
  storing instructions at a memory, the instructions including a first instruction and a second instruction, the first instruction comprising a pointer to the location of the second instruction in the memory, for organizing the first and second instructions into a link list;
  dispatching, to the device, the instructions including the first instruction and the second instruction stored in the memory;
  creating a first reference entry to the first dispatched instruction and a second reference entry to the second dispatched instruction, the first reference entry comprising a pointer to the location of the first instruction stored in the memory, and comprising the pointer to the location of the second instruction stored in the memory;
  storing, at a dispatcher cache, the first reference entry to the first dispatched instruction and the second reference entry to the second dispatched instruction;
  receiving a back off request for the second dispatched instruction,
  clearing the second reference entry from the dispatcher cache;
  dispatching, to the device, the second instruction from the memory based on the pointer to the location of the second instruction stored in the memory, in the first reference entry.

9. The method of claim 8, performed at a SAS/SATA controller.

10. The method of claim 9, wherein the controller comprises a transport layer, including a plurality of slices, a link list manager, a link list dispatcher, and the dispatcher cache.

11. The method of claim 10, wherein dispatching the first instruction and the second instruction comprises dispatching the first instruction to a first transport layer slice and dispatching the second instruction to a second transport layer slice.

12. The method of claim 11, wherein dispatching the second instruction comprises creating a connection request for a remote device.

13. The method of claim 12, further comprising backing off the connection request if the device is unavailable.

* * * * *